US011071139B2

(12) United States Patent
Talarico et al.

(10) Patent No.: US 11,071,139 B2
(45) Date of Patent: Jul. 20, 2021

(54) TECHNIQUES IN CONFIGURED GRANT UPLINK TRANSMISSION IN NEW RADIO (NR) SYSTEMS OPERATING IN UNLICENSED SPECTRUM

(71) Applicant: Apple Inc., Cupertino, CA (US)

(72) Inventors: Salvatore Talarico, Sunnyvale, CA (US); Gang Xiong, Portland, OR (US); Jeongho Jeon, San Jose, CA (US); Lopamudra Kundu, Santa Clara, CA (US); Hwan-Joon Kwon, Portland, OR (US)

(73) Assignee: Apple Inc., Cupertino, CA (US)

( * ) Notice: Subject to any disclaimer, the term of this patent is extended or adjusted under 35 U.S.C. 154(b) by 86 days.

(21) Appl. No.: 16/509,847

(22) Filed: Jul. 12, 2019

(65) Prior Publication Data

US 2019/0342911 A1    Nov. 7, 2019

Related U.S. Application Data

(60) Provisional application No. 62/697,857, filed on Jul. 13, 2018, provisional application No. 62/697,858, filed on Jul. 13, 2018.

(51) Int. Cl.
| | | |
|---|---|---|
| *H04W 72/14* | (2009.01) | |
| *H04W 72/04* | (2009.01) | |
| *H04W 72/12* | (2009.01) | |
| *H04L 5/00* | (2006.01) | |
| *H04L 1/18* | (2006.01) | |
| *H04W 80/02* | (2009.01) | |
| *H04W 76/27* | (2018.01) | |
| *H04L 1/00* | (2006.01) | |

(52) U.S. Cl.
CPC ........... *H04W 72/14* (2013.01); *H04L 1/0013* (2013.01); *H04L 1/1819* (2013.01); *H04L 5/0055* (2013.01); *H04L 5/0098* (2013.01); *H04W 72/0406* (2013.01); *H04W 72/0446* (2013.01); *H04W 72/1284* (2013.01); *H04W 76/27* (2018.02); *H04W 80/02* (2013.01); *H04L 5/0007* (2013.01)

(58) Field of Classification Search
CPC ............. H04W 72/14; H04W 72/0406; H04W 72/0446; H04W 72/1284; H04L 1/0013; H04L 1/1819; H04L 5/0055; H04L 5/0098; H04L 5/0007
See application file for complete search history.

(56) References Cited

U.S. PATENT DOCUMENTS

| | | | | |
|---|---|---|---|---|
| 2018/0006791 A1* | 1/2018 | Marinier | ............... | H04L 1/0061 |
| 2020/0314902 A1* | 10/2020 | Sun | ..................... | H04W 72/042 |
| 2020/0351851 A1* | 11/2020 | Aiba | ................... | H04W 72/042 |

(Continued)

OTHER PUBLICATIONS

R1-1812359 (Year: 2018).*

(Continued)

*Primary Examiner* — Melvin C Marcelo
(74) *Attorney, Agent, or Firm* — Kilpatrick Townsend & Stockton LLP

(57) ABSTRACT

Embodiments of the present disclosure describe methods, apparatuses, storage media, and systems for configuring, transmitting, and receiving configured grant uplink transmissions. Other embodiments may be described and claimed.

28 Claims, 8 Drawing Sheets

(56) References Cited

U.S. PATENT DOCUMENTS

2020/0359411 A1* 11/2020 Li .................... H04W 72/1268
2021/0050947 A1* 2/2021 Tsai ................... H04W 72/042

OTHER PUBLICATIONS

R1-1902590 (Year: 2019).*
R1-1904962 (Year: 2019).*
R1-1905024 (Year: 2019).*
R1-1901528 (Year: 2019).*
R1-1902043 (Year: 2019).*
R1-1904086 (Year: 2019).*
R1-1905460 (Year: 2019).*
3GPP, "Technical Specification Group Radio Access Network; NR; Multiplexing and channel coding (Release 15)," 3GPP TS 38.212 V15.2.0 (Jun. 2018), 5G, 98 pages.
3GPP, "Technical Specification Group Radio Access Network; NR; Medium Access Control (MAC) protocol specification (Release 15)," 3GPP TS 38.321 V15.2.0 (Jun. 2018), 5G, 73 pages.
3GPP, "Technical Specification Group Radio Access Network; NR; Radio Resource Control (RRC) protocol specification (Release 15)," 3GPP TS 38.331 V15.2.0 (Jun. 2018), 5G, 304 pages.
3GPP, "3rd Generation Partnership Project; Technical Specification Group Radio Access Network; Evolved Universal Terrestrial Radio Access (E-UTRA); Multiplexing and channel coding (Release 15)," 3GPP TS 36.212 V15.2.0 (Jun. 2018), 5G, 245 pages.
3GPP, "3rd Generation Partnership Project; Technical Specification Group Radio Access Network; NR; Physical layer procedures for control (Release 15)," 3GPP TS 38.213 V15.2.0 (Jun. 2018), 5G, 99 pages.

\* cited by examiner

TECHNIQUES IN CONFIGURED GRANT UPLINK TRANSMISSION IN NEW RADIO (NR) SYSTEMS OPERATING IN UNLICENSED SPECTRUM

CROSS REFERENCE TO RELATED APPLICATION

The present application claims priority to U.S. Provisional Patent Application No. 62/697,857, filed Jul. 13, 2018, entitled "Activation-Deactivation and Downlink Feedback Information For Autonomous Uplink Transmission in New Radio Systems Operating on Unlicensed Spectrum," and U.S. Provisional Patent Application No. 62/697,858, filed Jul. 13, 2018, entitled "UCI For Autonomous Uplink Transmission in New Radio Systems Operating on Unlicensed Spectrum," all of which are hereby incorporated by references in their entirety.

FIELD

Embodiments of the present invention relate generally to the technical field of wireless communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

With significantly increased number of mobile devices joining various wireless networks and needs for larger bandwidth, lower latency, and higher data rates in general, spectrum resource has become one of the limiting factors in wireless innovations and developments. One possible solution is to operate cellular devices on unlicensed spectrum via Licensed-Assisted Access (LAA), which expands the system bandwidth by utilizing the flexible carrier aggregation (CA) framework introduced by the LTE-Advanced system. In New Radio (NR) communications, operations in unlicensed or shared spectrum may also be beneficial as well as in Long Term Evolution (LTE) and like communications. Aspects of NR-based operation in unlicensed spectrum include:
1. Physical channels inheriting the choices of duplex mode, waveform, carrier bandwidth, subcarrier spacing, frame structure, and physical layer design made as part of the NR study and avoiding unnecessary divergence with decisions made in the NR WI
    Consider unlicensed bands both below and above 6 GHz, up to 52.6 GHz
    Consider unlicensed bands above 52.6 GHz to the extent that waveform design principles remain unchanged with respect to below 52.6 GHz bands
    Consider similar forward compatibility principles made in the NR WI
2. Initial access, channel access. Scheduling/hybrid automatic repeat request (HARD), and mobility including connected/inactive/idle mode operation and radio-link monitoring/failure
3. Coexistence methods within NR-based and between NR-based operation in unlicensed and LTE-based LAA and with other incumbent RATs in accordance with regulatory requirements in e.g., 5 GHz, 37 GHz, 60 GHz bands
    Coexistence methods already defined for 5 GHz band in LTE-based LAA context should be assumed as the baseline for 5 GHz operation. Enhancements in 5 GHz over these methods should not be precluded. NR-based operation in unlicensed spectrum should not impact deployed Wi-Fi services (data, video and voice services) more than an additional Wi-Fi network on the same carrier.

One of the challenges in designing such a system is that this system needs to maintain fair coexistence with other incumbent technologies. In accordance, some restrictions may be taken into account depending on particular band(s) in which the system may operate. For instance, if operating in a 5 GHz band, a listen before talk (LBT) procedure needs to be performed to acquire the medium before a transmission can occur. In such a case, the scheduled uplink (UL) performance may be greatly degraded due to the "quadruple" contention for a user equipment (UE) to access the UL, which is that, 1) UE to send scheduling request (SR), 2) LBT performed at the base station before sending UL grant (especially in the case of self-carrier scheduling), 3) UE scheduling (internal contention amongst UEs associated with the same base station) and 4) LBT performed only by the scheduled UE. Further, the four necessary subframes for processing delay between a UL grant and a physical uplink shared channel (PUSCH) transmission represent an additional performance constraint.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
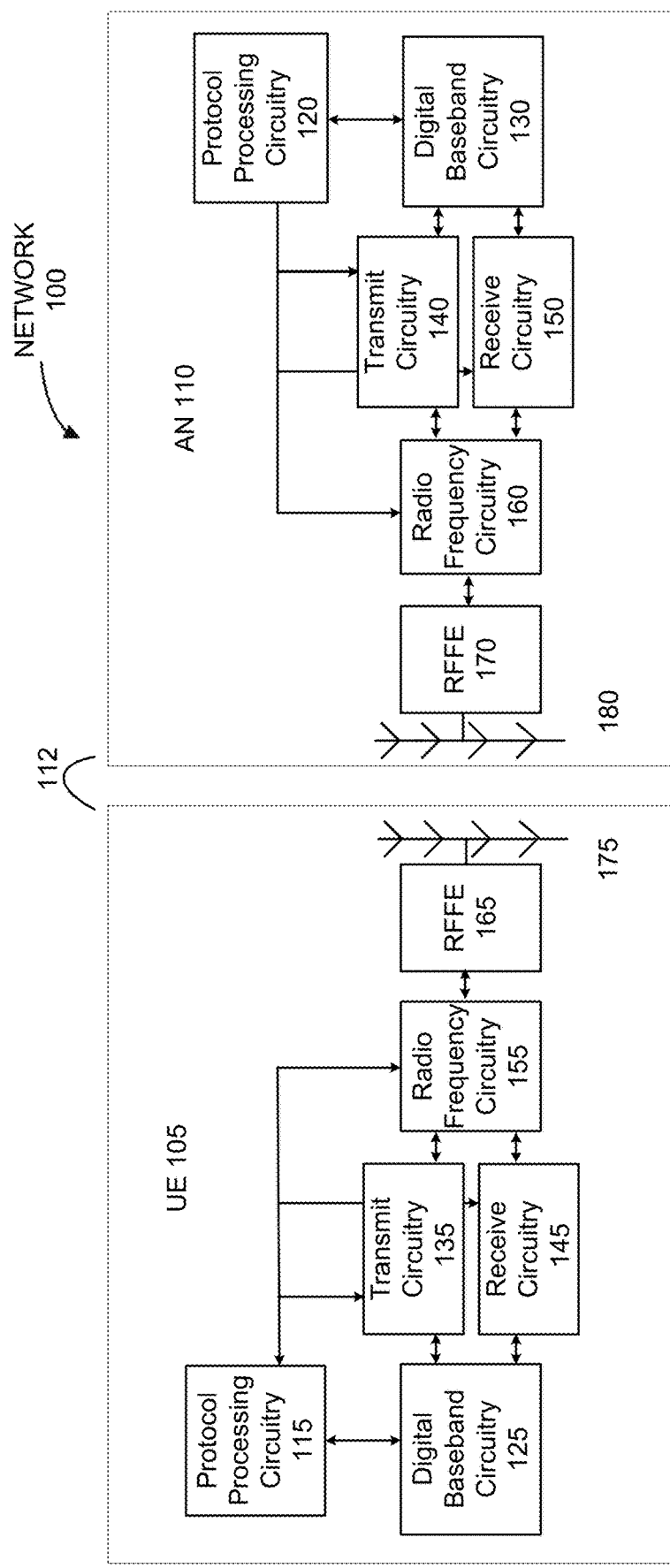
FIG. 1 schematically illustrates an example of a network comprising a user equipment (UE) and an access node (AN) in a wireless network, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

As used herein, the term "configured grant (CG) UL transmission" may refer to, be part of, or include a UL transmission without grant from anchored base station. Further, "autonomous UL transmission," "grant-free UL transmission," "grantless UL transmission (GUL)," and "UL transmission without dynamic grant" are used interchangeably throughout the discussions herein.

As earlier discussed, a CG UL transmission may improve or mitigate the impact caused by the quadruple contention for a UE to access a UL transmission in an unlicensed spectrum. Accordingly, an activation and deactivation of the CG UL may be needed to activate and/or deactivate the CG in the NR network operating in an unlicensed spectrum. A grant-free transmission for New Radio (NR) operating on unlicensed spectrum may address the above-mentioned concerns. In the grant-free transmission for NR operating on unlicensed spectrum, new techniques may be required in handling activation/deactivation of CG UL transmission and other related solutions in this regard. Various embodiments herein addresses how the CG UL may be activated and/or deactivated and corresponding acknowledgement of the activation/deactivation of the CG UL, to avoid or reduce any mismatch and/or improve system performance.

Embodiments described herein may include, for example, apparatuses, methods, and storage media for activating and/or deactivating a CG UL of, or related to, NR operations in an unlicensed spectrum as well as a design for downlink feedback information (DFI)—downlink control information (DCI) that is used to carry feedback information related to the UL transmissions.

FIG. 1 schematically illustrates an example wireless network 100 (hereinafter "network 100") in accordance with various embodiments herein. The network 100 may include a UE 105 in wireless communications with an AN 110. In some embodiments, the network 100 may be an NR network operating in an unlicensed spectrum. The UE 105 may be configured to connect, for example, to be communicatively coupled, with the AN 110. In this example, the connection 112 is illustrated as an air interface to enable communicative coupling, and can be consistent with cellular communications protocols such as a 5G NR protocol operating at mmWave and/or sub-6 GHz, a NR in unlicensed spectrum (NR-U), a Listen-before-Talk (LBT) protocol, a code-division multiple access (CDMA) network protocol, a Push-to-Talk (PTT) protocol, and the like.

When operating in unlicensed radio frequency spectrum bands, wireless devices such as the AN 110 and UE 105 may employ LBT procedures to ensure the channel is clear before transmitting data. In some cases, operations in unlicensed bands may be based on a carrier aggregation (CA) configuration in conjunction with CCs operating in a licensed band. Operations in unlicensed spectrum may include DL transmissions, UL transmissions, or both. Duplexing in unlicensed spectrum may be based on frequency division duplexing (FDD), time division duplexing (TDD) or a combination of both. Additionally or alternatively, a grant-free UL transmission may be used in the unlicensed spectrum to avoid quadruple contention.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 105 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 110 can enable or terminate the connection 112. The AN 110 can be referred to as a base station (BS), NodeB, evolved-NodeB (eNB), Next-Generation NodeB (gNB or ng-gNB), NG-RAN node, cell, serving cell, neighbor cell, and so forth, and can comprise ground stations (for example, terrestrial access points) or satellite stations providing coverage within a geographic area.

The AN 110 can be the first point of contact for the UE 105. In some embodiments, the AN 110 can fulfill various logical functions including, but not limited to, radio network controller (RNC) functions such as radio bearer management, uplink and downlink dynamic radio resource management and data packet scheduling, and mobility management.

In some embodiments, a downlink resource grid can be used for downlink transmissions from the AN 110 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and hybrid automatic repeat request (HARD) information related to the uplink shared channel. Typically, downlink scheduling (assigning control and shared channel resource blocks to the UE 105 within a cell) may be performed at the AN 110 based on channel quality information fed back from any of the UE 105. The downlink resource assignment information may be sent on the PDCCH used for (for example, assigned to) the UE 105.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition.

Some embodiments may use concepts for resource allocation for control channel information that are an extension of the above-described concepts. For example, some embodiments may utilize an enhanced physical downlink control channel (ePDCCH) that uses PDSCH resources for control information transmission. The ePDCCH may be transmitted using one or more enhanced control channel elements (ECCEs). Similar to the above, each ECCE may correspond to nine sets of four physical resource elements known as enhanced resource element groups (EREGs). An ECCE may have other numbers of EREGs in some situations.

As shown in FIG. 1, the UE 105 may include millimeter wave communication circuitry grouped according to functions. The UE 105 may include protocol processing circuitry 115, which may implement one or more of layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of HARQ functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and RF front end (RFFE) 165, which may include or connect to one or more antenna panels 175.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

Figure 2:
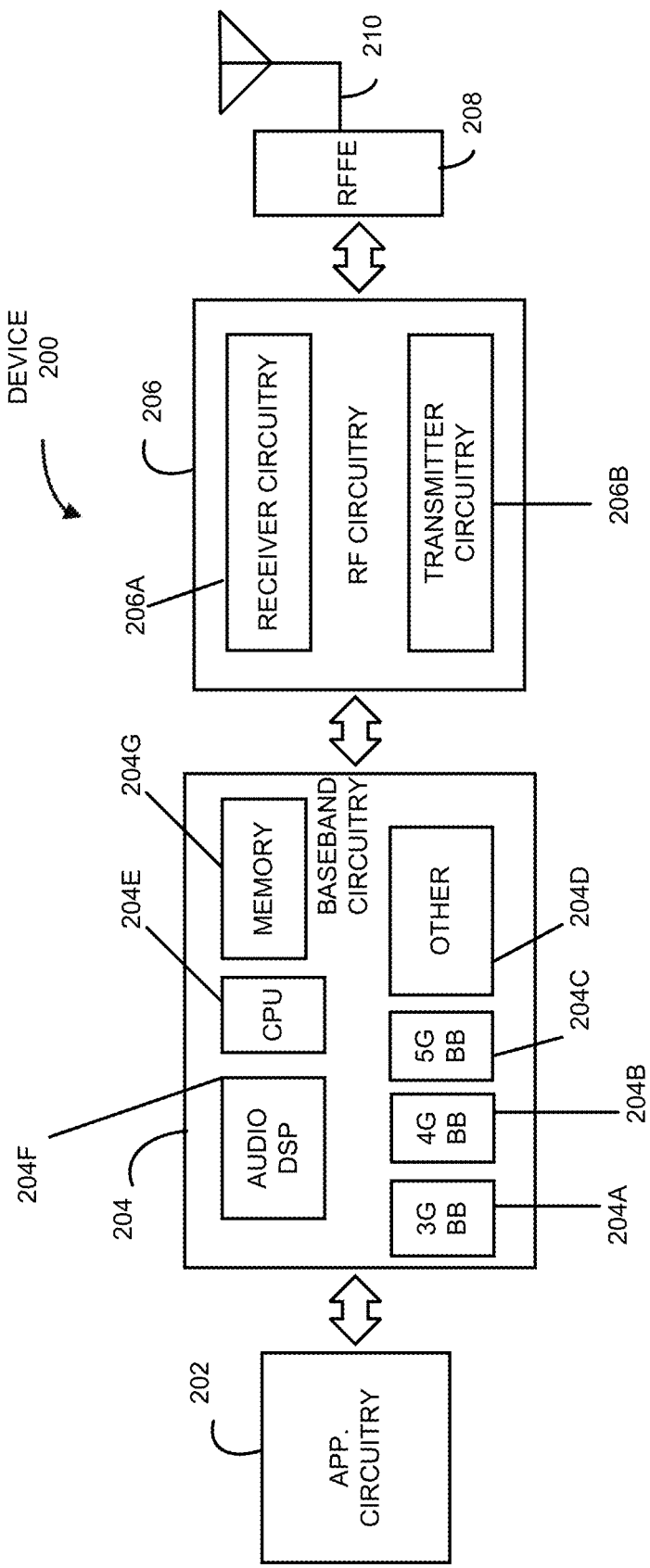
FIG. 2 illustrates example components of a device in accordance with various embodiments.
Figure 7:
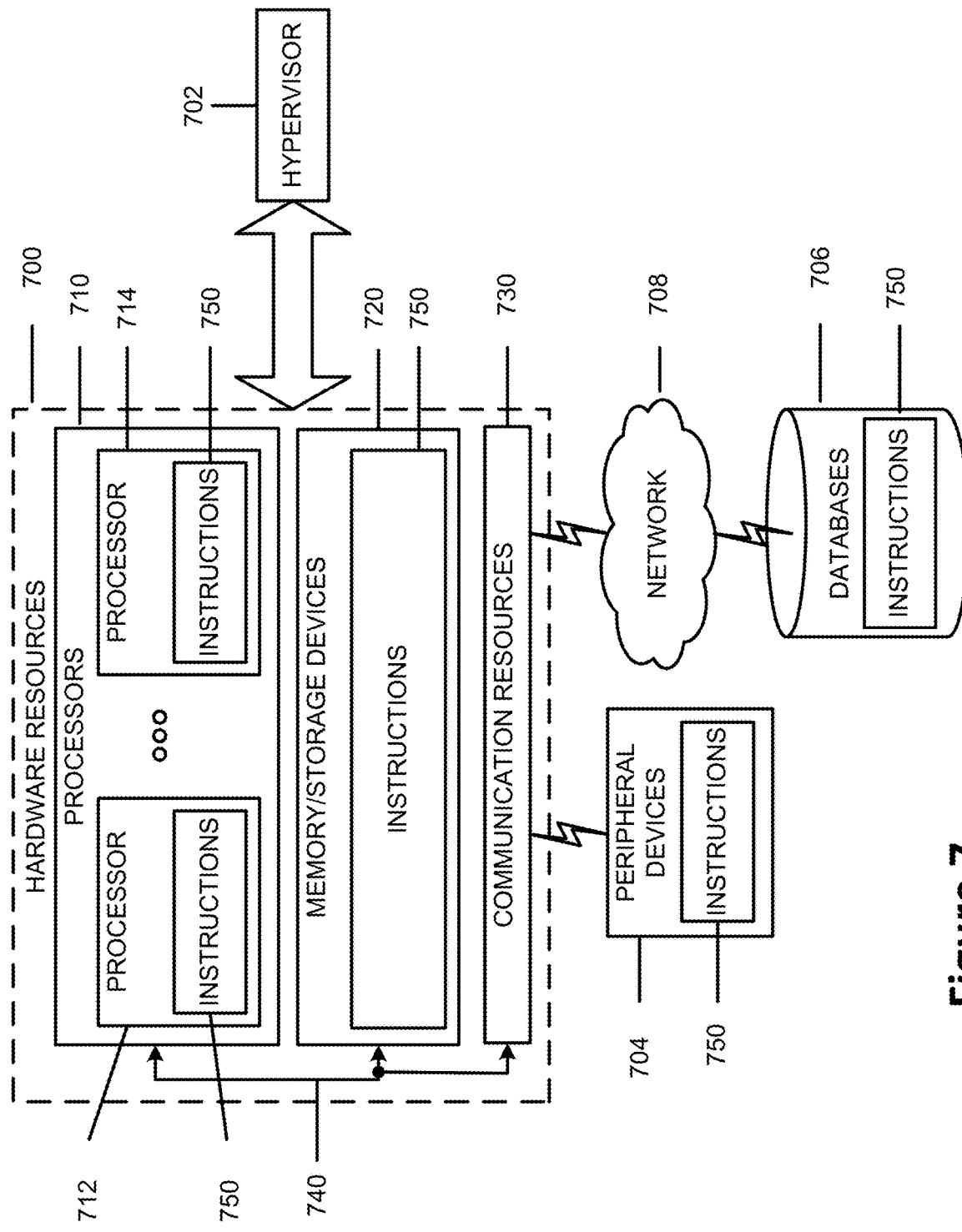
FIG. 7 illustrates hardware resources in accordance with some embodiments.
Figure 8:
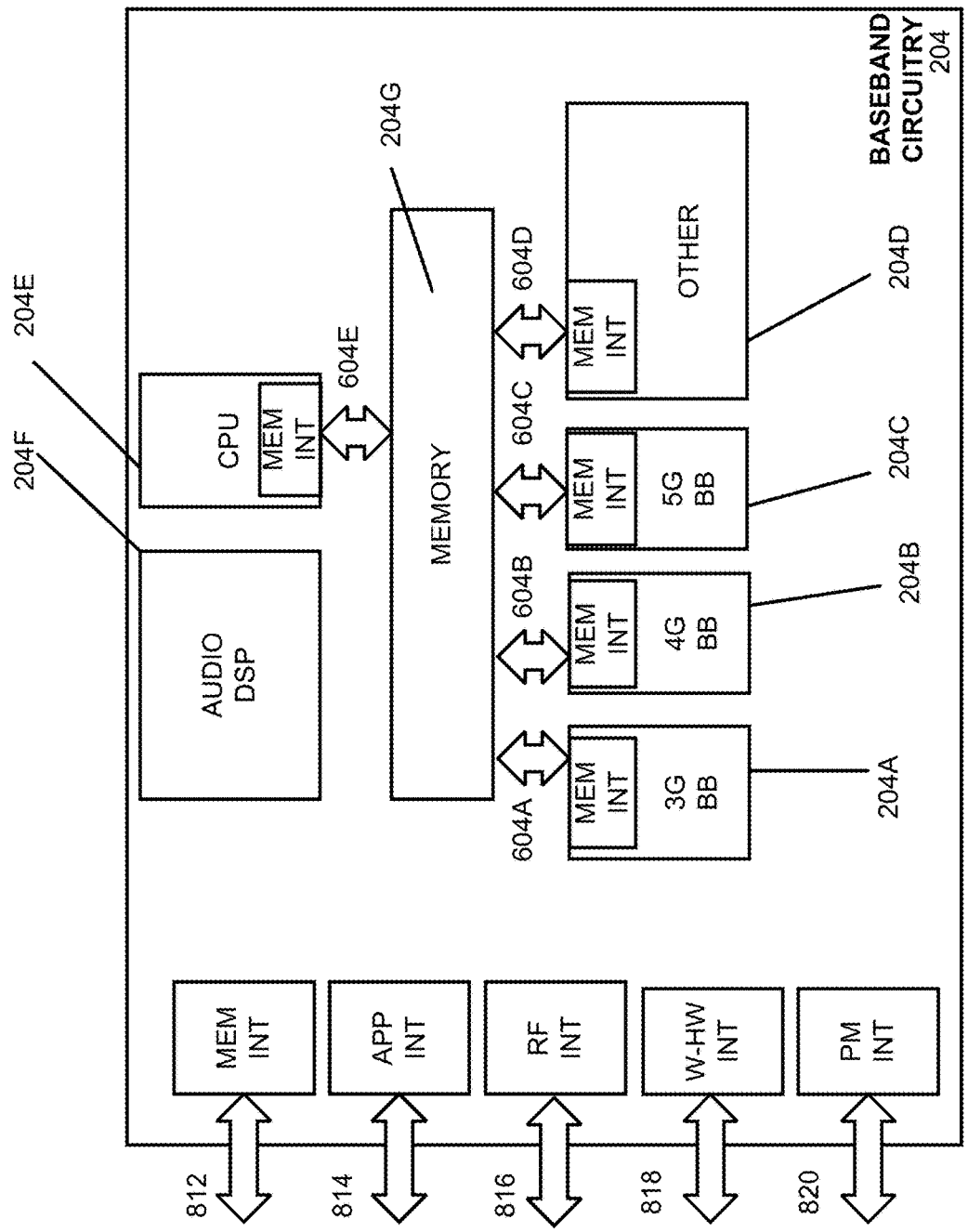
FIG. 8 illustrates example interfaces of baseband circuitry in accordance with some embodiments.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the AN 110 by receive-beamforming signals received by a plurality of antennas/antenna elements of the one or more antenna panels 175. Further details regarding the UE 105 architecture are illustrated in FIGS. 2 and 7-8. The transmission from the AN 110 may be transmit-beamformed by antennas of the AN 110. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include mmWave/sub-mmWave communication circuitry grouped according to functions. The AN 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

A UL and/or DL transmission may be established by and via the protocol processing circuitry 120, digital baseband circuitry 130, transmit circuitry 140, RF circuitry 160, RFFE 170, and one or more antenna panels 180. The one or more antenna panels 180 may transmit a signal by forming a transmit beam and or receive a signal by forming a receiving beam.

FIG. 2 illustrates example components of a device 200 in accordance with some embodiments. In contrast to FIG. 1, FIG. 2 illustrates example components of the UE 105 or the AN 110 from a receiving and/or transmitting function point of view, and it may not include all of the components described in FIG. 1. In some embodiments, the device 200 may include application circuitry 202, baseband circuitry 204, RF circuitry 206, RFFE circuitry 208, and a plurality of antennas 210 together at least as shown. The baseband circuitry 204 may be similar to and substantially interchangeable with the baseband circuitry 125 in some embodiments. The plurality of antennas 210 may constitute one or more antenna panels for beamforming. The components of the illustrated device 200 may be included in a UE or an AN. In some embodiments, the device 200 may include fewer elements (for example, a cell may not utilize the application circuitry 202, and instead include a processor/controller to process IP data received from an EPC). In some embodiments, the device 200 may include additional elements such as, for example, a memory/storage, display, camera, sensor, or input/output (I/O) interface. In other embodiments, the components described below may be included in more than one device (for example, said circuitry may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may be similar to and substantially interchangeable with the baseband circuitry 125 and the baseband circuitry 130 in some embodiments. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (for example, second generation (2G), sixth generation (6G), etc.). The baseband circuitry 204 (for example, one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a central processing unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 204 and the application circuitry 202 may be implemented together such as, for example, on a SOC.

In some embodiments, the baseband circuitry 204 may provide for communication compatible with one or more radio technologies. For example, in some embodiments, the baseband circuitry 204 may support communication with an evolved universal terrestrial radio access network (E-UTRAN) or other wireless metropolitan area networks (WMAN), a wireless local area network (WLAN), a wireless personal area network (WPAN), an NR network, an NR-U network. Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the RFFE circuitry 208 and provide baseband signals to the baseband circuitry 204. RF circuitry 206 may also include transmitter circuitry 206B, which may include circuitry to up-convert baseband signals provided by the baseband circuitry 204 and provide RF output signals to the RFFE circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

RFFE circuitry 208 may include a receive signal path, which may include circuitry configured to operate on RF beams received from one or more antennas 210. The RF beams may be transmit beams formed and transmitted by the AN 110 while operating in mmWave or sub-mmWave frequency rang. The RFFE circuitry 208 coupled with the one or more antennas 210 may receive the transmit beams and proceed them to the RF circuitry 206 for further processing. RFFE circuitry 208 may also include a transmit signal path, which may include circuitry configured to amplify signals for transmission provided by the RF circuitry 206 for transmission by one or more of the antennas 210, with or without beamforming. In various embodiments, the amplification through transmit or receive signal paths may be done solely in the RF circuitry 206, solely in the RFFE circuitry 208, or in both the RF circuitry 206 and the RFFE circuitry 208.

In some embodiments, the RFFE circuitry 208 may include a TX/RX switch to switch between transmit mode and receive mode operation. The RFFE circuitry 208 may include a receive signal path and a transmit signal path. The receive signal path of the RFFE circuitry 208 may include a low noise amplifier (LNA) to amplify received RF beams and provide the amplified received RF signals as an output (for example, to the RF circuitry 206). The transmit signal path of the RFFE circuitry 208 may include a power amplifier (PA) to amplify input RF signals (for example, provided by RF circuitry 206), and one or more filters to generate RF signals for beamforming and subsequent transmission (for example, by one or more of the one or more antennas 210).

Processors of the application circuitry 202 and processors of the baseband circuitry 204 may be used to execute elements of one or more instances of a protocol stack. For example, processors of the baseband circuitry 204, alone or in combination, may be used to execute Layer 3, Layer 2, or Layer 1 functionality, while processors of the application circuitry 202 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/AN, described in further detail below.

There may be two grant mechanisms for an NR operation in unlicensed spectrum, Type 1 and Type 2. Type 1 may be based on an RRC configuration. Type 2 may be based on an RRC configuration and a Layer 1 (L1) activation and deactivation. Type 1 mechanism may have an advantage that the UE 105 can start a grant-free transmission as the corresponding RRC configured, since there is no waiting for L1 activation message. Meanwhile, Type 2 mechanism may be more flexible in indicating, including but not limited to, desired time and/or frequency domain resources, UE-specific demodulation reference signal (DMRS) configurations, and modulation coding scheme (MCS)/transport block size (TBS) values. Further, a network may have better controllability with Type 2 in terms of managing a set of autonomous UEs for uplink transmission.

A downlink control information (DCI) and/or downlink feedback information (DFI) may be required in a Type 2 configured grant in activating or deactivating the grant-free UL transmission feature. A gNB may configure or generate a DCI and/or DFI message or a message including the DCI and/or DFI to activate/deactivate the AUL transmission for a UE. Various embodiments of new DCI and/or DFI are described as follows:

I. Format 0_0 and Format 0_1

In some embodiments, the DCI format may use the DCI format 0_0 and/or DCI format 0_1 from the legacy NR and assign CG UL activation/deactivation information accordingly. Table 1 provides a summary of the fields of the DCI format 0_0 and DCI format 0_1, where $N_{RB}^{UL,BWP}$ may indicate the size of the active UL bandwidth part in case DCI format 0_0 is monitored in a UE specific search space and satisfy the following conditions:
 the total number of different DCI sizes monitored per slot is no more than 4 for the cell
 the total number of different DCI sizes with C-RNTI monitored per slot is no more than 3 for the cell
Otherwise, $N_{RB}^{UL,BWP}$ may indicate the size of the initial UL bandwidth.

TABLE 1

Summary of DCI format 0_0 or 0_1

| Fields | DCI format 0_0 (bits) | DCI format 0_1 (bits) |
|---|---|---|
| Identifier for DCI formats | 1 | 1 |
| Frequency domain resource assignment | $\lceil \log_2(N_{RB}^{UL,BWP}(N_{RB}^{UL,BWP} + 1)/2)\rceil$ | $\lceil N_{RB}^{UL,BWP}/P \rceil$ if resource allocation type 0 $\lceil \log_2(N_{RB}^{UL,BWP}(N_{RB}^{UL,BWP} + 1)/2)\rceil$ if resource allocation type 1, or for both resource allocation $\max(\lceil \log_2(N_{RB}^{UL,BWP}(N_{RB}^{UL,BWP} + 1)/2)\rceil , \lceil N_{RB}^{UL,BWP}/P\rceil) + 1$ |
| Time domain resource assignment | 4 | 1, 2, 3, or 4 |
| Frequency hopping flag | 1 | 0 or 1 |
| Modulation and coding scheme | 5 | 5 |
| New data indicator | 1 | 1 |
| Redundancy version | 2 | 2 |
| HARQ process number | 4 | 4 |
| TPC command for scheduled PUSCH | 2 | 2 |
| UL/SUL indicator | 0 or 1 | 0 or 1 |
| Carrier indicator | — | 0 or 3 |
| Bandwidth part indicator | — | 0,1, or 2 |
| VRB-to-PRB mapping | — | 0 or 1 |
| 1st downlink assignment index | — | 1 or 2 |
| 2nd downlink assignment index | — | 0 or 2 |

TABLE 1-continued

Summary of DCI format 0_0 or 0_1

| Fields | DCI format 0_0 (bits) | DCI format 0_1 (bits) |
| --- | --- | --- |
| SRS resource indicator. | — | $\left\lceil \log_2\left(\sum_{k=1}^{L_{max}} \binom{N_{SRS}}{k}\right) \right\rceil$ or $\lceil \log_2(N_{SRS}) \rceil$ |
| Precoding information and number of layers | — | 0, 2, 3, 4, 5, or 6 |
| Antenna ports | — | 2, 3, 4, or 5 |
| SRS request | — | 2 |
| CSI request | — | 0, 1, 2, 3, 4, 5, or 6 |
| CBG transmission information | — | 0, 2, 4, 6, or 8 |
| PTRS-DMRS association | — | 0 or 2 |
| beta_offset indicator | — | 0 or 2 |
| DMRS sequence initialization | — | 0 or 1 |

In some embodiments, the same format used for DCI in CG activation/deactivation may be used for the DFI as well. Thus, an indicator or flag may be used to distinguish the DCI and the DFI or DFI-DCI. In one example, the field "identifier for DCI formats" of the DCI format 0_0 and/or DCI format 0_1 may indicate whether the corresponding DCI format 0_0 and/or DCI format 0_1 is used for activation/deactivation DCI or HARQ feedback (DFI-DCI). For example, a "1" in the field "identifier for DCI formats" may indicate that this is for DCI activation/deactivation, and a "0" in the field "identifier for DCI formats" may indicate that this is for HARQ feedback.

In some embodiments, when the DCI format 0_0 and/or DCI format 0_1 are used for indicating CG activation/deactivation, further coding may be used to indicate respective activation and deactivation, as shown as an example in Tables 2(a) and (b).

TABLE 2(a)

DCI coding for activation

| | DCI format 0_0/0_1 |
| --- | --- |
| HARQ process number | set to all '0's |
| Redundancy version | set to '00' |

TABLE 2(b)

DCI coding for deactivation

| | DCI format 0_0 | DCI format 0_1 |
| --- | --- | --- |
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Further, for the DCI format 0_0, one or more of the following fields of the DCI format 0_0 may be used:
  Modulation and coding scheme
  TPC command for scheduled PUSCH
while other fields may be padded with zeros or ones to indicate activation or deactivation, respectively. For the DCI format 0_1, one or more of the following fields of the DCI format 0_1 may be used:
  Modulation and coding scheme
  TPC command for scheduled PUSCH
  Carrier indicator
  Bandwidth part indicator
  VRB-to-PRB mapping
  Precoding information and number of layers
  Antenna ports
  CBG transmission information
  PTRS-DMRS association
  beta_offset indicator
  DMRS sequence initialization
  CSI request
  SRS request
  SRS resource indicator
while other fields may be padded with zeros or ones to indicate activation or deactivation, respectively. In embodiments, one or more of the fields listed above may be RRC configured, and/or omitted to be transmitted in the DCI.

In some embodiments, if format 0_0 and/or format 0_1 are used for activation/deactivation of the grant-free UL transmission, one or more of the following fields may be included:
X bits to indicate the frequency domain resources (i.e, interlaces) for grant-free UL transmission:
  the indication of the frequency domain resources may be of a bitmap;
  the indication of the frequency domain resources may be provided as an offset from the lower or higher PRB within the bandwidth used.
  the indication of the frequency domain resources may be provided as the indices of the interlace(s) that can be used for grant-free UL transmission.
  The indication of the frequency domain resources may be a set of the resource blocks that can be used for grant-free UL transmission.
Y bits to indicate the time-domain resources for grant-free UL transmission operation:
  The indication of the time domain resources may be of a bitmap, which may indicate the slots/symbols that can be used for grant-free UL transmission. The bitmap may have a length of X bits, and each bit may indicate whether a specific time-domain resource can be used, and the granularity may be at symbols level, at slot level or radio frame level.
  The time domain resources available for grant-free UL transmission may be derived from a tuple of parameters (i.e., {periodicity, offset/starting position, and duration}). In this case, the "offset/starting" may indicate the exact starting point from where the time domain resources are allowed for GUL begins, the "duration"

may indicate the consecutive resources allowed for GUL starting from the "offset/starting" point, and the "periodicity" may indicate the period after which this defined window of available resources for GUL transmissions is repeated.

In some embodiments, physical resources in time and frequency domains may be configured by RRC signaling. Further, a bitmap in the DCI for an activation of Type 2 CG UL transmission may be used to indicate whether a subset or a full set of configured physical resources can be used for the CG UL transmission. Note that the physical resources may be located in the same or different slots, component carriers, or bandwidth portions (e.g., in different 20 MHz bandwidths that are located in different portions of a wide system bandwidth that is larger than 20 MHz).

In some embodiments, for Type 1 CG UL transmission, physical resources in time and frequency domains may be configured by RRC configurations. Depending on the outcome of an LBT, UE may select one of the configured multiple time/frequency resources for grant-free uplink transmission.

In some embodiments, the frequency-domain resources for grant-free UL transmission may be indicated via activation/deactivation DCI, and the time-domain resources may be configured via RRC.

In some embodiments regarding a new DFI-DCI format, the payload size of the DCI Format 0_0 and/or DCI Format 0_1 in Table 1 may be maintained, and some or all of the fields of the DCI Format 0_0 and/or DCI Format 0_1 may be to carry or indicate one or more following items of information:

Bitmap with one HARQ-Acknowledgement (ACK) bit per CG configured HARQ process per TB (Z bits per TB, where Z is the total number of HARQ process IDs, e.g., Z=16).
Transmit Power Control (TPC) command for PUSCH (2 bits)
Modulation and coding scheme (5 bits)
Carrier indicator (if format 0_1 is used)
Bandwidth part indicator (if format 0_1 is used)
Antenna ports (if format 0_1 is used)
DMRS sequence initialization (if format 0_1 is used)

Note that in case of a grouped HARQ-ACK feedback for a group of UEs, the order of HARQ-ACK feedback for a given UE may be configured by an RRC signaling in a UE specific manner. After receiving the DFI-DCI, UE may derive the HARQ-ACK feedback based on the configured order and corresponding HARQ-ACK field.

In embodiments, in order to maintain the same size between the activation/deactivation DCI and DFI-DCI, the DFI-DCI may be padded with all zeros or all ones to have the same size as the activation/deactivation DCI.

In some embodiments, in order to reduce or prevent additional hypothesis testing, the cyclic redundancy check (CRC) of the DCI for activation/deactivation and DFI information may be masked with a new common radio network temporary identifier (RNTI), which may be named as AUL cell RNTI (AUL-C-RNTI). The AUL-C-RNTI may be configured by higher layers via NR minimum system information (MSI), NR remaining minimum system information (RMSI), NR other system information (OSI) or RRC signaling.

In some embodiments, the RNTI may be the same for both activation/deactivation DCI and for the DFI-DCI. Alternatively, the new RNTI may be UE specific, or group specific. In some embodiments, the RNTI used for DCI and/or DFI-DCI may be a semi-persistence scheduling (SPS) C-RNTI or C-RNTI.

II. Clean Slate Design

In some embodiments, a new DCI format that is different from the DCI Format 0_0 and DCI Format 0_1 may be used to activate/deactivate a grant-free UL transmission. In some embodiments, the DCI format for activation/deactivation and the DCI-DFI format for HARQ-ACK feedback may have the same size to reduce complexity for UE and/or reduce related hypothesis testing. Accordingly, a flag or indicator may be needed to distinguish those two.

In some embodiments, one or more of the fields in table 3(a) may be used in the DCI for the activation/deactivation of CG UL transmission.

TABLE 3(a)

New DCI format for Activation/Deactivation

| Fields | DCI format (bits) |
|---|---|
| Interpretation Flag | 1 |
| Time domain resources | Y |
| Frequency domain resources | X |
| Modulation and coding scheme | 5 |
| TPC command for scheduled PUSCH | 2 |
| Carrier indicator | 0 or 3 bits |
| Bandwidth part indicator | 0, 1, or 2 |
| Precoding information and number of layers | 0, 2, 3, 4, 5, or 6 |
| Antenna ports | 2, 3, 4, or 5 |
| SRS request | 2 |
| CSI request | 0, 1, 2, 3, 4, 5, or 6 |
| CBG transmission information | 0, 2, 4, 6, or 8 |
| PTRS-DMRS association | 0 or 2 |
| DMRS sequence initialization | 0 or 1 |
| AUL Activation/Deactivation | 1 or more |

In some embodiments, one or more of the fields in table 3(b) may be used in the DCI for carrying downlink feedback information.

TABLE 3(b)

New DCI format for Activation/Deactivation

| Fields | DCI format (bits) |
|---|---|
| Interpretation Flag | 1 |
| HARQ bitmap | Z |
| Modulation and coding scheme | 5 |
| TPC command for scheduled PUSCH | 2 |
| Carrier indicator | 0 or 3 bits |
| Bandwidth part indicator | 0, 1, or 2 |
| Precoding information and number of layers | 0, 2, 3, 4, 5, or 6 |
| Antenna ports | 2, 3, 4, or 5 |
| SRS request | 2 |
| CSI request | 0, 1, 2, 3, 4, 5, or 6 |
| CBG transmission information | 0, 2, 4, 6, or 8 |
| PTRS-DMRS association | 0 or 2 |
| DMRS sequence initialization | 0 or 1 |
| Padding | 1 or more |

In some embodiments, the CRC of the new DCIs used for activation/deactivation and DFI information may be masked with a new common RNTI, named AUL-C-RNTI. Alternatively, the new RNTI may be UE specific, or group specific. In embodiments, the RNTI used for these two new DCIs can be an SPS C-RNTI or a C-RNTI.

Figures 3A, 3B:
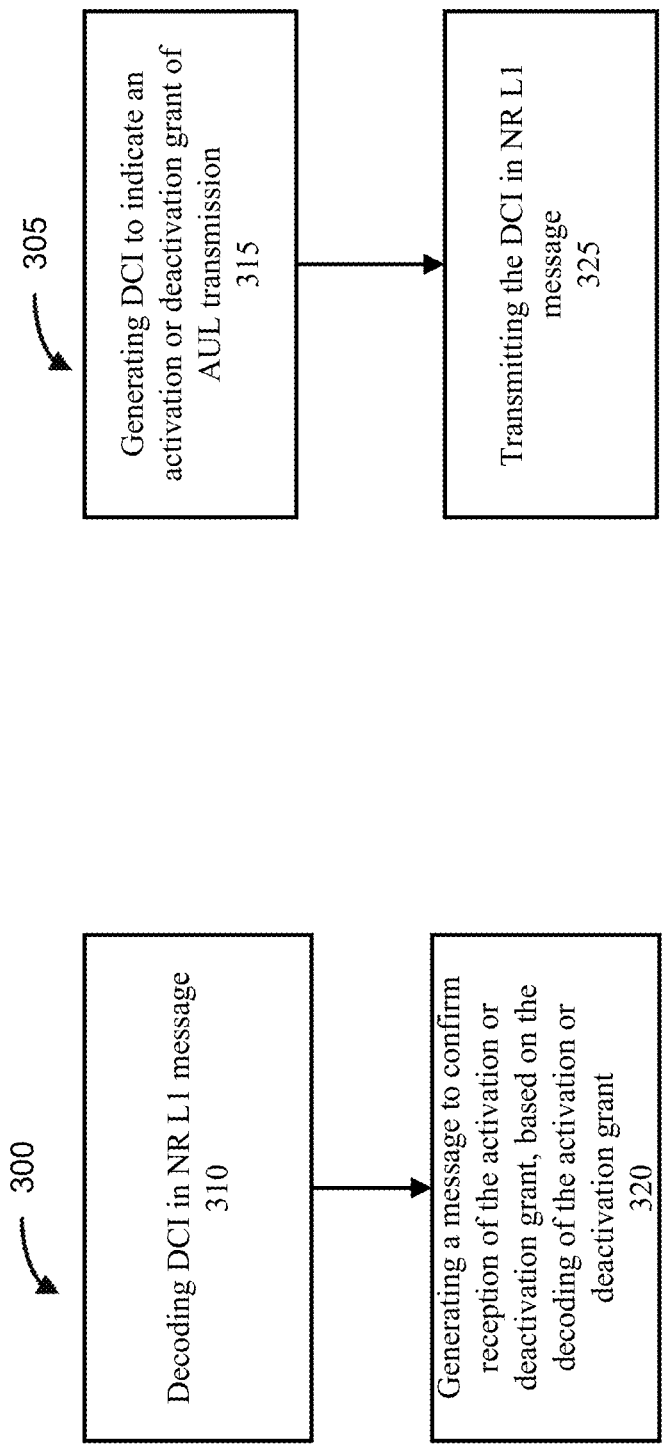
FIG. 3A illustrates an operation flow/algorithmic structure to facilitate a process of activation/deactivation of configured grant (CG) operation by a UE in an NR network operating in an unlicensed spectrum, in accordance with various embodiments.
FIG. 3B illustrates the operation flow/algorithmic structure to facilitate the process of the activation/deactivation of CG from a base-station perspective in the NR network operating in an unlicensed spectrum, in accordance with various embodiments.

FIG. 3A illustrates an operation flow/algorithmic structure 300 to facilitate a process of activation/deactivation of CG UL transmission by the UE 105 in an NR network operating in an unlicensed spectrum, in accordance with various embodiments. The operation flow/algorithmic structure 300 may be performed by the UE 105 or circuitry thereof.

The operation flow/algorithmic structure 300 may include, at 310, decoding an activation or deactivation grant of a DCI in an NR L1 message, based on reception of the NR L1 message. The NR L1 message may be generated by a gNB in an NR network. The gNB may be the same as or substantially similar to the AN 110. The UE 105 may receive the NR L1 message and decode the DCI of the message to detect a CG UL activation/deactivation indicated by the DCI. The NR L1 message may be transmitted and received via NR services between the AN 110 and the UE 105 in an unlicensed spectrum. The NR services may operate at a frequency of FR1 or FR2. The activation/deactivation of CG UL may be indicated by the DCI. Various formats of the DCI may be used as addressed above. This activation/deactivation DCI may be the only downlink control information that carries MCS field, and/or frequency/time resources assigned for the AUL. To avoid or reduce mismatch between the assigned resources and/or MCS by the gNB and the utilized resources and/or MCS by the UE, the UE may be required to send an acknowledgement regarding the reception of the activation/deactivation DCI. For example, if two DCIs carry different MCS and/or resources (frequency/time) information, and both of the DCIs are received and decoded by the UE, UE may determine its MCS and frequency/time resources based on one DCI. Then, there may be a mismatch between the MCS and/or time/frequency resources used by the UE and the one assigned by the gNB but not chosen by the UE.

The operation flow/algorithmic structure 300 may further include, at 320, generating a message to confirm reception of the activation or deactivation grant, based on the decoding of the activation or deactivation grant. The message may be generated by using one or more medium access control (MAC) control elements (CEs). In NR communications, MAC CEs may serve multiple purposes in both UL MAC and DL MAC, as the MAC CEs of LTE communications do. Various values associated with a logic channel identification (LCID) may indicate various information carried by a MAC CE. For example, Table 4 illustrates an example mapping and/or indication between indexes and LCID values with regard to a DL shared channel (DL-SCH).

TABLE 4

LCID values for DL-SCH

| Index | LCID Values |
|---|---|
| 00000 | CCCH |
| 00001-01010 | Identity of the logical channel |
| 01011 | CCCH |
| 01100 | CCCH |
| 01101 | CCCH and Extended Power Headroom Report |
| 01110-01111 | Reserved |
| 10000 | Extended logical channel ID field |
| 10001 | Reserved |
| 10010 | AUL confirmation (4 octets) |
| 10011 | AUL confirmation (1 octet) |
| 10100 | Recommended bit rate query |
| 10101 | SPS confirmation |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |

In some embodiments, a MAC CE may be used to confirm the reception of the activation/deactivation DCI. The MAC CE may be transmitted via scheduled grant UL based on the reception of the activation/deactivation DCI and/or after successfully decoding the activation/deactivation DCI. In some embodiments, the CG UL transmission may only begin after the UE sends the MAC CE in grant-based (GB) UL mode. In some embodiments, the MAC CE may be transmitted at an earliest available occasion regardless of that the UE has data or not.

FIG. 3B illustrates an operation flow/algorithmic structure 305 to facilitate the process of CG UL activation/deactivation by the AN 110 in an NR network operating in an unlicensed spectrum, in accordance with various embodiments. The operation flow/algorithmic structure 305 may be performed by the AN 110 or circuitry thereof. The AN 110 may be a gNB in the NR network.

The operation flow/algorithmic structure 305 may include, at 315, generating DCI to indicate an activation or deactivation grant of CG UL transmission. The DCI may be transmitted in an NR L1 message. The NR L1 message may be generated by a gNB in an NR network. The gNB may be the same as or substantially similar to the the AN 110. The UE 105 may receive the NR L1 message and decode the DCI of the message to detect an activation/deactivation of CG UL indicated by the DCI. The activation/deactivation of CG UL transmission may be indicated by the DCI. Various formats of the DCI may be used as addressed above. This activation/deactivation DCI may be the only downlink control information that carries MCS field, and/or frequency/time resources assigned for the CG UL transmission.

The operation flow/algorithmic structure 305 may further include, at 325, transmitting the DCI in an NR L1 message to a UE. The NR L1 message may be generated by the gNB. The NR L1 message may be transmitted and received via NR services between the AN 110 and the UE 105.

In some embodiments, a timer may be used to trigger or monitor activation/deactivation DCI transmission. The gNB may not receive the acknowledgement message, and it may be because that the UE has not received the activation/deactivation DCI properly or due to a pre-occupancy and/or busyness of the used UL channel. This timer may start when the activation/deactivation DCI is transmitted by the gNB. The timer may stop and reset once the acknowledgement message (MAC CE) is received by the gNB in response to the activation grant. Then the timer may restart when a (re)activation grant is sent. The eNB may retransmit the activation/deactivation DCI upon expiration of the timer.

In some embodiments regarding the deactivation grant, the UE may send an acknowledgement of the deactivation grant to the gNB through a MAC CE transmitted in a first scheduled UL transmission using one interlace or in a first opportunity of available UL transmission. Upon reception of the acknowledgement of the deactivation grant, the gNB may release the resources assigned for the CG UL transmission.

In some embodiments, acknowledgement may not be needed for deactivation, which may save one interlace with one byte MAC CE transmission. The deactivation grant acknowledgement may not be needed, because it may be straightforward for the eNB to find out whether CG UL transmission is deactivated or not for a specific UE by detecting a corresponding CG UL transmission and/or finding a specific UE-ID in a corresponding CG-UCI. In some embodiments, if the eNB detects an AUL transmission with the UE-ID equal to the one that the eNB intends to deactivate, the gNB may transmit the deactivation grant again.

III. Cell-Specific (SPS) RRC

In some embodiments, an alternative solution to activate and deactivate the CG UL transmission may use a Type 1 configuration grant and configure the grant-free resources via RRC signaling. In some embodiments, UE may not report specific MAC UE feedback. In a legacy NR, the structure of the configured grant IE may be as follows:

In some embodiments, the field above may be modified, and may have a bitmap format. The bitmap may have a length of X bits, where X can be, for example, 40 bits. Each bit of the X bits may indicate whether a specific time-domain resource can be used, and the granularity may be at a symbol level, slot level, or radio frame level.

```
        frequencyDomainAllocation              BIT STRING (SIZE(18)),
```

```
-- ASN1START
-- TAG-CONFIGUREDGRANTCONFIG-START
ConfiguredGrantConfig ::=               SEQUENCE {
    frequencyHopping                    ENUMERATED {mode1, mode2}
        OPTIONAL,       -- Need S,
    cg-DMRS-Configuration               DMRS-UplinkConfig,
    mcs-Table                           ENUMERATED {qam256, spare1}
        OPTIONAL,       -- Need S
    mcs-TableTransformPrecoder          ENUMERATED {qam256, spare1}
            OPTIONAL,       -- Need S
    uci-OnPUSCH                             SetupRelease { CG-UCI-OnPUSCH },
    resourceAllocation                  ENUMERATED { resourceAllocationType0,
resourceAllocationType1, dynamicSwitch },
    rbg-Size                            ENUMERATED {config2}
        OPTIONAL,       -- Need S
    powerControlLoopToUse               ENUMERATED {n0, n1},
    p0-PUSCH-Alpha                          P0-PUSCH-AlphaSetId,
    transformPrecoder                   ENUMERATED {enabled}
        OPTIONAL,       -- Need S
    nrofHARQ-Processes                  INTEGER(1..16),
    repK                                ENUMERATED {n1, n2, n4, n8},
    repK-RV                                 ENUMERATED {s1-0231, s2-0303, s3-0000}
            OPTIONAL,       -- Cond RepK
    periodicity                         ENUMERATED {
                                            sym2, sym7, sym1x14, sym2x14, sym4x14,
sym5x14, sym8x14, sym10x14, sym16x14, sym20x14,
                                            sym32x14, sym40x14, sym64x14, sym80x14,
sym128x14, sym160x14, sym256x14, sym320x14, sym512x14,
                                            sym640x14, sym1024x14, sym1280x14,
sym2560x14, sym5120x14,
                                            sym6, sym1x12, sym2x12, sym4x12, sym5x12,
sym8x12, sym10x12, sym16x12, sym20x12, sym32x12,
                                            sym40x12, sym64x12, sym80x12, sym128x12,
sym160x12, sym256x12, sym320x12, sym512x12, sym640x12,
                                            sym1280x12, sym2560x12
                                        },
    configuredGrantTimer                INTEGER (1..64)
        OPTIONAL,       -- Need R
    rrc-ConfiguredUplinkGrant           SEQUENCE {
        timeDomainOffset                    INTEGER (0..5119),
        timeDomainAllocation                INTEGER (0..15),
        frequencyDomainAllocation           BIT STRING (SIZE(18)),
        antennaPort                         INTEGER (0..31),
        dmrs-SeqInitialization          INTEGER (0..1)
        OPTIONAL, -- Cond NoTransformPrecoder
        precodingAndNumberOfLayers          INTEGER (0..63),
        srs-ResourceIndicator           INTEGER (0..15),
            mcsAndTBS                       INTEGER (0..31),
            frequencyHoppingOffset          INTEGER (1.. maxNrofPhysicalResourceBlocks-1)
        OPTIONAL,       -- Need M
            pathlossReferenceIndex          INTEGER (0..maxNrofPUSCH-
PathlossReferenceRSs-1),
        ...
    }
    OPTIONAL -- Need R
}
CG-UCI-OnPUSCH ::= CHOICE {
    dynamic                             SEQUENCE (SIZE (1..4)) OF BetaOffsets,
    semiStatic                          BetaOffsets
}
-- TAG-CONFIGUREDGRANTCONFIG-STOP
-- ASN1STOP
```

In some embodiments, in order to allocate a set of time/frequency domain resources for CG UL transmission, some fields related to the IE ConfiguredGrantConfig, which originally may be used to configure uplink transmission without dynamic grant, may be modified as follows:

```
        timeDomainAllocation              INTEGER (0 . . . 15),
```

In some embodiments, the field above may be modified to indicate the frequency interlaces that may be allowed for grant-free UL transmission. In some embodiments, this field may be a bitmap, where each bit may indicate a given interlace. In some embodiments, this field may indicate the indices of the interlace(s) that may be used for grant-free UL transmission. In some embodiments, this field may indicate a set of the resource blocks that may be used for grant-free UL transmission. In other embodiments, this field may indicate a subset or a set of frequency resources in the same or a different bandwidth part or component carrier (e.g., in one or more different 20 MHz bandwidths in a wide system bandwidth, e.g., 100 MHz).

IV. Uplink Control Information (UCI)

In a grant-free transmission, a UE may perform transmissions without requiring or granting of a transmission grant to or from a base station, a suitable UCI from the UE may be dedicated to grant-free transmissions. Various embodiments herein are provided regarding UCI content and resource mapping of the UCI in grant-free transmission.

In order to efficiently operate the grant-free operation, the dependency on timing to the HARQ process ID selection may be removed, and it may be preferred for UE to opportunistically select one HARQ process ID from a given set. Since the HARQ ID may not be selected by the UE, and the UE transmission may not be scheduled, the UE may provide the HARQ process ID together with its UE-ID to the gNB upon PUSCH transmission via UCI.

In NR communications, UCI may contain HARQ ACK/Non-ACK (NACK) feedback, schedule request (SR) and CSI information, and be transmitted on PUCCH or piggybacked on PUSCH. In a grant-free transmission, the UCI may contain at least a UE-ID and HARQ process ID. Thus, a new UCI format, as well as its transmission procedure, may be defined, such that it may contain minimal information required by the gNB to reduce signaling overhead.

Uplink Control Information (UCI) feedback may include HARQ-ACK bits, SR bits (and/or positive SR bits), and periodic or aperiodic Channel State Information (CSI). The CSI may comprise Channel Quality Indicator (CQI), precoding matrix indicator (PMI), CSI-RS resource indicator (CRI), SS/PBCH Block Resource indicator (SSBRI), layer indicator (LI), rank indicator (RI), and/or beam related information (e.g., L1-RSRP or other like beam information).

In some embodiments, a new UCI may be introduced for grant-free transmission. The new UCI may be referred to as "grant-free UCI" or "G-UCI" or "CG-UCI." The CG-UCI may comprise one or more of the following fields:
  AUL C-RNTI (e.g., 16 bits can be used).
  HARQ process ID (e.g., 4 bits can be used).
  Redundancy version (RV) (e.g., 2 or 3 bits can be used).
  New data indicator (NDI) (e.g., 1 bit).
  PUSCH starting symbol (e.g., 1, 2, 3 or 4 bits can be used)—indicates the starting position of PUSCH, or whether the first symbol of the current slot is punctured.
  PUSCH ending symbol (e.g., 1, 2, 3 or 4 bits)—indicates the ending position of PUSCH, or whether the last symbol of the current slot is punctured.
  Channel occupancy time (COT) sharing indication.
  Number of slots from the remaining Maximum COT (MCOT) that can be used by the gNB.
  Priority class if UL to DL MCOT sharing is allowed.
  Aperiodic CSI (A-CSI) indication for current PUSCH.

It is noted that the number of bits for each field may not be limited to the listed example numbers as above, other numbers of bits for each field may be extended.

In some embodiments, CG-UCI may be transmitted in all the slots within the MCOT acquired by the grant-free UE. Or, the CG-UCI may be carried in all grant-free PUSCH transmissions.

In some embodiments, the content of the CG-UCI may be the same for all the slots within the MCOT acquired by the grant-free UE. In some embodiments, in order to allow grant-free transmission to be more agile, of reduced complexity, and/or of reduced latencies due to LBT failures, the CG-UCI may be piggybacked on uplink data within each PUSCH transmission.

In another embodiment, in case of repetitions of CG-UCI transmission, CG-UCI may be only transmitted in the grant-free PUSCH in the first slot within a repetition.

In some embodiments, a UL to DL MCOT sharing may be allowed. In such a scenario, the gNB may only be allowed to transmit PDCCH carrying DCI, and the transmission may be limited to a number of symbols, for example, two OFDM symbols for each transmission.

In other embodiments, if the UL-DL-UL sharing is not allowed, the gNB may or may not perform LBT, depending, among other things, on a gap between the corresponding UL and DL. For example, in some embodiments, if the gap between the UL and DL is less than 16 microseconds ($\mu s$), the gNB may not need to perform LBT. If the gap is between 16 $\mu s$ and 25 $\mu s$, the gNB may perform Type 2 channel access, which may be a 25 $\mu s$ LBT, for every DL transmission. If the gap is larger than 25 $\mu s$, the gNB may perform Type 1 channel access.

In some embodiments, Type 1 uplink channel access procedure may not include channel sensing before the UE can transmit on that channel. Type 2 uplink channel access procedure may include to perform CCA over a short period. The duration of the period is fixed to be at least 25 $\mu s$.

In some embodiments, the gNB may or may not perform LBT based on a particular gap size between the UL and DL. For example, DL transmission may only be allowed if the gap is not larger or equal than 25 $\mu s$. In such a case, the LBT requirement and channel access types may follow the similar procedure as mentioned in the above embodiments.

In some embodiments, DL data may be aggregated to the DCI transmitted on the remaining MCOT, and they may be only devoted to the UE that acquired the MCOT. In other embodiments, both DL data and DCI may be devoted to any UE within the MCOT acquired by a specific grant-free UL UE. In some embodiments, the remaining MCOT may remain unutilized and not be shared with the gNB.

In some embodiment, the UE may inform the gNB about the remaining MCOT via the CG-UCI. For example, 3 or 4 bits may be utilized to inform the gNB about the length of the remaining MCOT and another 3 or 4 bits may be utilized to provide information regarding the end of the grant-free UL transmission performed over the acquired MCOT. Alternatively, a total of 3 or 4 bits may be used to jointly indicate the length of the remaining MCOT as well as the information related to the end of the grant-free UL transmission.

In some embodiments, the remaining MCOT may be only used for DCI, and only one bit may be used in the UCI to inform the gNB that the following slot is the last slot for the grant-free UL burst, which may be either in the next slot or in a number of N slots from the current slot. For example, if a processing delay of 1 ms is necessary, the number of N may change based on the numerology used. The gNB may be allowed to transmit the DCI.

In some embodiments, the UE may only provide or indicate the end of the grant-free UL transmission, but not need to indicate the length of the remaining COT since the gNB may only transmit the DCI through a limited number of OFDM symbols.

Figure 4:
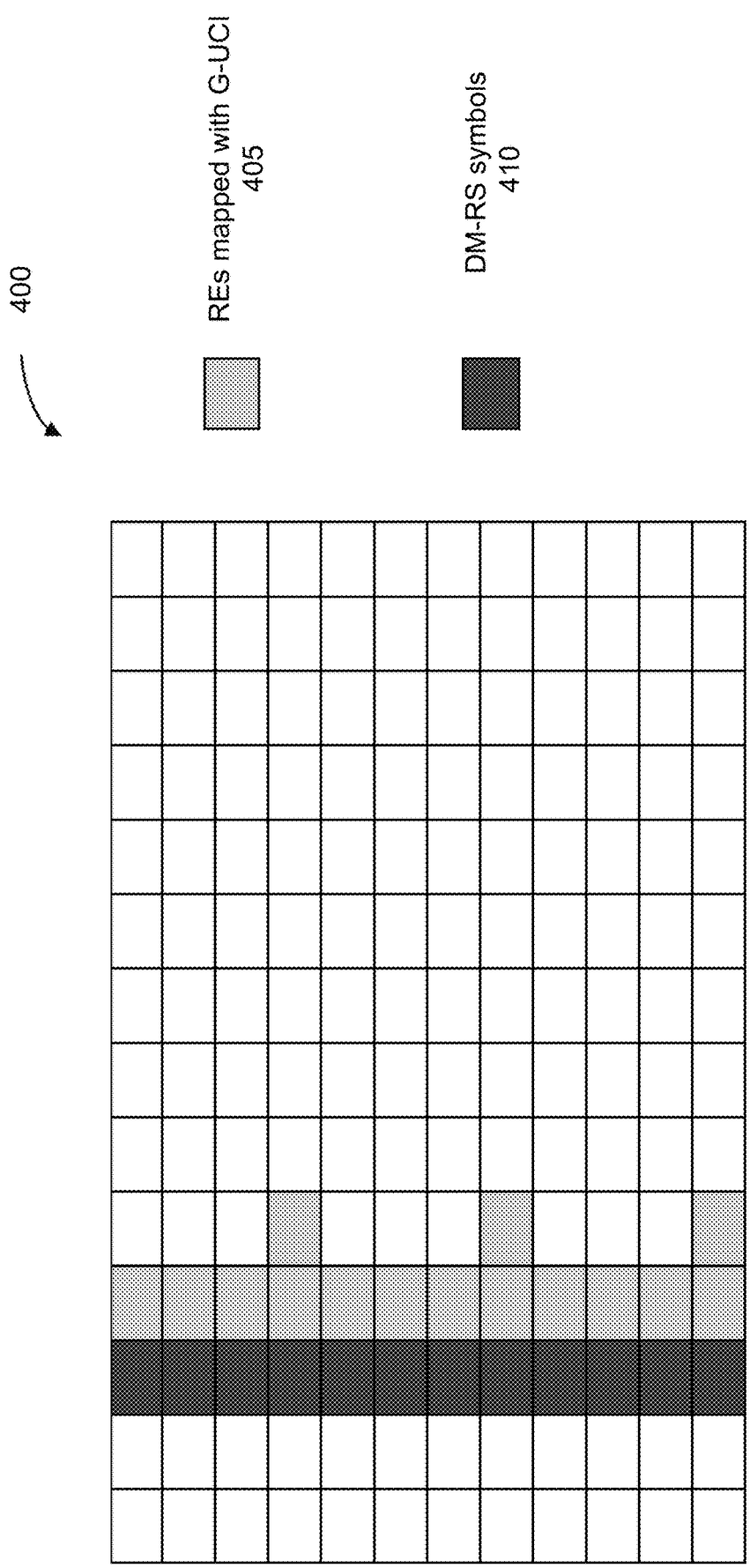
FIGS. 4-6 illustrate various examples of uplink control information (UCI) mapping onto a physical uplink shared channel (PUSCH) in the CG transmission in accordance with various embodiments.

In some embodiments, CG-UCI may be multiplexed with an Uplink shared channel (UL-SCH) on a PUSCH. A rule or a set of rules for mapping the CG-UCI onto PUSCH may follow the mapping rules defined in NR for HARQ-ACK feedback with more than two bits of a payload size on the PUSCH. Further, the UL-SCH may be rate-matched with the CG-UCI. The PUSCH may be used to transmit the uplink shared channel (UL-SCH) and L1 and L2 control information. The UL-SCH may be the transport channel used for transmitting uplink data (one or more transport blocks). L1 and L2 control signaling may carry HARQ acknowledgements for received downlink shared channel (DL-SCH) blocks, channel quality reports, and scheduling requests. An example G-UCI mapping is illustrated in FIG. 4. FIG. 4 illustrates a slot 400 that includes 14 OFDM symbols of one subcarrier, which includes one resource block that includes 12 resource elements. The resource elements (REs) mapped with G-UCI 405 may be mapped as HARQ-ACK bits of the UCI and piggybacked on the PUSCH for scheduled UL transmission. The demodulation reference signal (DM-RS) symbol 410 may be mapped as legacy channel estimation.

Figure 5:
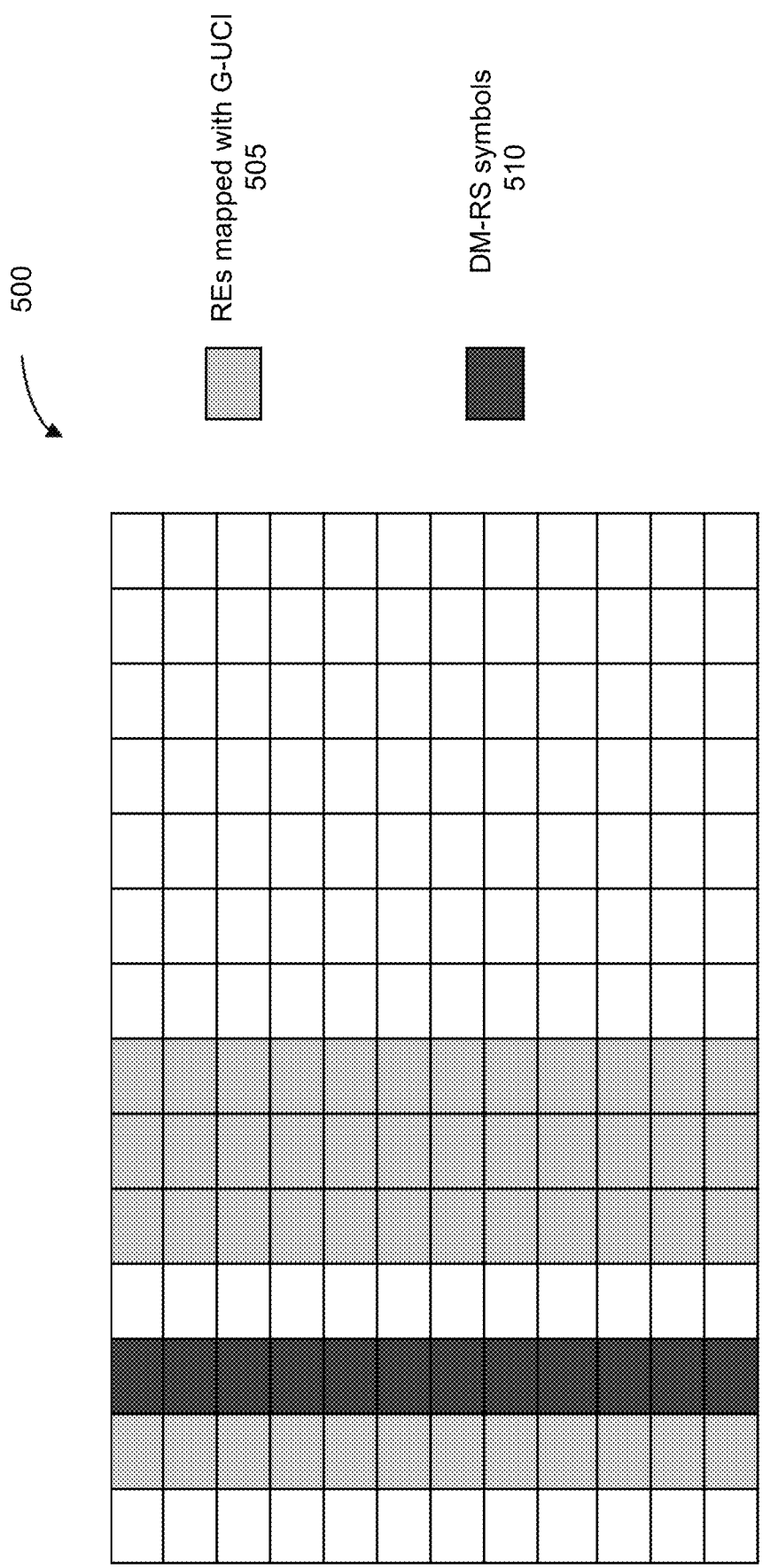

FIG. 5 illustrates another example of CG-UCI mapping, in which the REs mapped with CG-UCI 505 may start from the second symbol of the slot 500. Similarly to FIG. 4, the demodulation reference signal (DM-RS) symbol 510 may be mapped as legacy channel estimation.

In some embodiment, the mapping rule for CG-UCI onto PUSCH may follow the same mapping rule as defined for CSI part 1 on PUSCH. To avoid the potential puncturing of CG-UCI in the first symbol due to LBT operation, the CG-UCI may not be transmitted on the first symbol. Further, in one example, when CG-UCI is mapped on PUSCH, reserved REs for 0, 1, 2 bit HARQ-ACK feedback may not be considered, which indicates that CG-UCI may be mapped on the OFDM symbol that is right after DM-RS symbol. Alternatively, when CG-UCI is mapped on PUSCH, reserved REs for 0, 1, 2 bit HARQ-ACK feedback may still be considered. In this case, UL-SCH may be mapped on the HARQ-ACK reserved REs.

In addition, when frequency hopping is applied for PUSCH, CG-UCI may be mapped on starting from the first symbol on PUSCH in the second hop.

Figure 6:
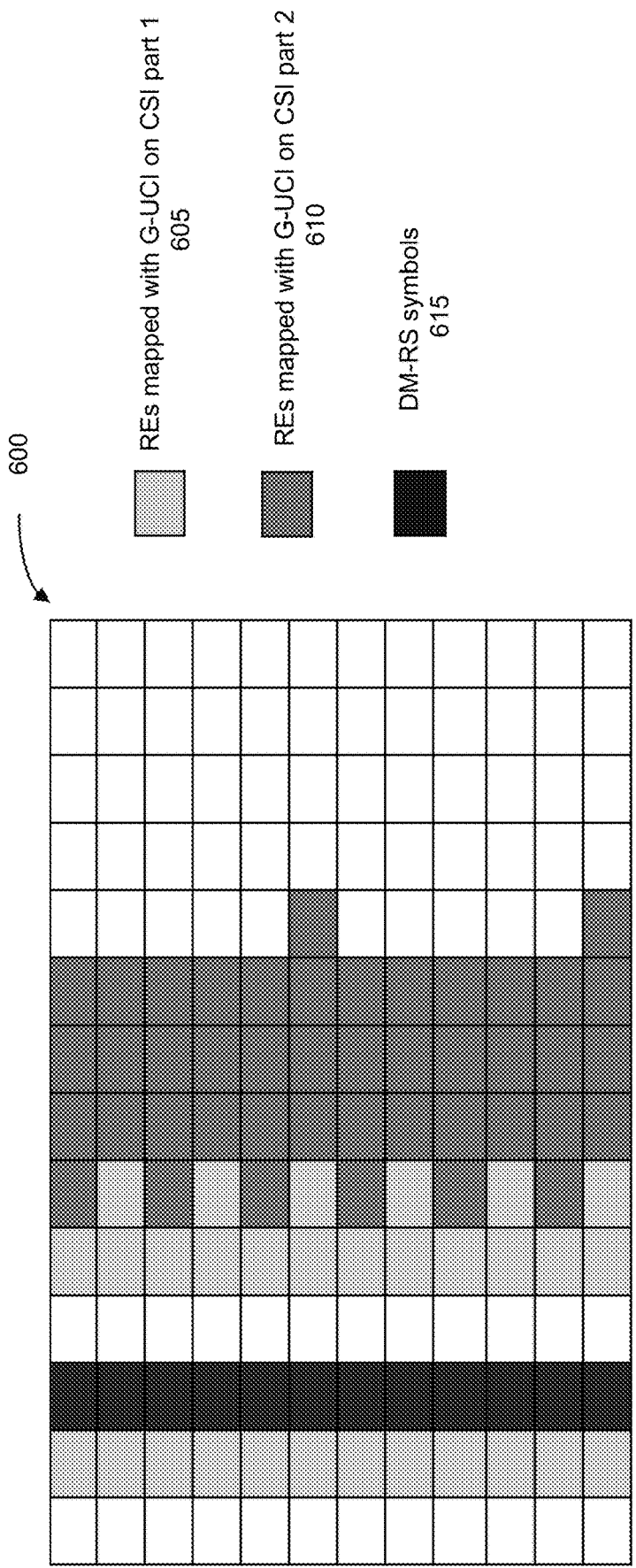

FIG. 6 illustrates another example of CG-UCI mapping, in which a slot 600 includes 14 symbols over one subcarrier. Similarly to FIGS. 4 and 5, the demodulation reference signal (DM-RS) symbol 615 may be mapped as legacy channel estimation.

In some embodiments, the mapping rule for CG-UCI on PUSCH may follow the same mapping rule as defined for a union of CSI part 1 and part 2 on PUSCH. Similarly, with respect to FIG. 5, to avoid potential puncturing of CG-UCI in the first symbol due to LBT operation, CG-UCI may not be transmitted on the first symbol. Further, reserved REs for HARQ-ACK feedback may or may not be considered in the mapping on PUSCH.

In some embodiments, the CG-UCI may be mapped from symbol #1 up to symbol #12 (a symbol index starts from #0 within a slot), starting from the highest or lowest subcarrier index of the frequency resource block available for CG UL transmissions. In some embodiments, symbol #0 and symbol #13 (i.e., the first and last symbols within a slot) may not be used for CG-UCI. In some embodiments, the CG-UCI may be mapped on a number of X symbols after the first symbol of PUSCH, where X, for example, may be 2 or 3. In some embodiments, the UL-SCH may be rate-matched around the CG-UCI on the PUSCH.

In embodiments, the number of coded modulation symbols per layer for CG-UCI transmission may be evaluated as follows:

$$Q'_{G\text{-}UCI\_1} = \min\left\{ \left\lceil \frac{(O_{G\text{-}UCI} + L_{G\text{-}UCI}) \cdot \beta_{offset}^{G\text{-}UCI} \cdot \sum_{l=0}^{N_{symb,all}^{PUSCH}-1} M_{sc}^{UCI}(l)}{\sum_{r=0}^{C_{UL\text{-}SCH}-1} K_r} \right\rceil, \left\lceil \alpha \cdot \sum_{l=l_0}^{N_{symb,all}^{PUSCH}-1} M_{sc}^{UCI}(l) \right\rceil \right\}$$

where $O_{G\text{-}UCI}$ is the number of CG-UCI bits, and $L_{G\text{-}UCI}$ may indicate the CRC bits for the CG-UCI, for example, $L_{G\text{-}UCI}=16$ as in legacy. $\beta_{offset}^{G\text{-}UCI}$ indicates an offset value, and $\alpha$ indicates a scaling coefficient, which is configured by a higher layer, $N_{sumb,all}^{PUSCH}$ is the total number of OFDM symbols for PUSCH, including all OFDM symbols used for DMRS. $C_{UL\text{-}SCH}$ is the number of code blocks for UL-SCH of the PUSCH transmission, and $K_r$ is the r-th code block size for UL-SCH of the PUSCH transmission. $M_{sc}^{UCI}$ is the number of resource elements that may be used for transmission of UCI in OFDM symbol l, for l=0, 1, 2, . . . , $N_{symb,all}^{PUSCH}-1$, in the PUSCH transmission.

In some embodiments, if the CSI part 2 is also used to map part of the CG-UCI, the number of coded modulation symbols per layer for CG-UCI transmission for the CG-UCI into the CSI part 2 RE may be evaluated as follows:

$$Q'_{G\text{-}UCI\_2} = \min\left\{ \left\lceil \frac{(O_{G\text{-}UCI\_2} + L_{G\text{-}UCI}) \cdot \beta_{offset}^{G\text{-}UCI} \cdot \sum_{l=0}^{N_{symb,all}^{PUSCH}-1} M_{sc}^{UCI}(l)}{\sum_{r=0}^{C_{UL\text{-}SCH}-1} K_r} \right\rceil, \left\lceil \alpha \cdot \sum_{l=l_0}^{N_{symb,all}^{PUSCH}-1} M_{sc}^{UCI}(l) \right\rceil - Q'_{G\text{-}UCI\_1} \right\}$$

where $O_{G\text{-}UCI\_2}$ is the number of CG-UCI bits mapped into the CSI part 2 REs, and $L_{G\text{-}UCI}=16$, which indicates the CRC bits for the CG-UCI.

In some embodiments, a new parameter $I_{offset}^{G\text{-}UCI}$ may be introduced which indicates the specific value of $\beta_{offset}^{G\text{-}UCI}$, $I_{offset}^{G\text{-}UCI}$ may be RRC signaled or dynamically indicated in the DCI for activation of grant free uplink transmission or a combination thereof. For instance, for Type 1 configured grant uplink transmission, beta offset for CG-UCI may be configured by higher layers. For Type 2 configured grant uplink transmission, a combination of RRC signaling and DCI in activation of configured grant uplink transmission may be used to indicate the beta offset value for CG-UCI. Specifically, a set of beta offset values may be configured by RRC signaling and one field in the DCI may be used to indicate one beta offset value of the set of values may be used for CG-UCI on PUSCH. $\beta_{offset}^{G\text{-}UCI}$ values may be the same as those defined in legacy NR for $\beta_{offset}^{HARQ-ACK}$, and the mapping of $\beta_{offset}^{G-UCI}$ values for CG-UCI and the index signaled by higher layers may be in accordance with Table 5.

TABLE 5

Example of mapping between $\beta_{offset}^{G-UCI}$ and the higher layer index $I_{offset}^{G-UCI}$

| $I_{offset}^{G-UCI}$ | $\beta_{offset}^{G-UCI}$ |
|---|---|
| 0 | 1.000 |
| 1 | 2.000 |
| 2 | 2.500 |
| 3 | 3.125 |
| 4 | 4.000 |
| 5 | 5.000 |
| 6 | 6.250 |
| 7 | 8.000 |
| 8 | 10.000 |
| 9 | 12.625 |
| 10 | 15.875 |
| 11 | 20.000 |
| 12 | 31.000 |
| 13 | 50.000 |
| 14 | 80.000 |
| 15 | 126.000 |
| 16 | Reserved |
| 17 | Reserved |
| 18 | Reserved |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |

In some embodiments, $\beta_{offset}^{G-UCI}$ values may be the same as those defined in legacy NR for $\beta_{offset}^{CSI-1}$ and $\beta_{offset}^{CSI-2}$, and the mapping of $\beta_{offset}^{G-UCI}$ values for CG-UCI and the index signaled by higher layers may be in accordance with Table 6.

TABLE 6

Example of mapping between $\beta_{offset}^{G-UCI}$ and the higher layer index $I_{offset}^{G-UCI}$

| $I_{offset}^{G-UCI}$ | $\beta_{offset}^{G-UCI}$ |
|---|---|
| 0 | 1.125 |
| 1 | 1.250 |
| 2 | 1.375 |
| 3 | 1.625 |
| 4 | 1.750 |
| 5 | 2.000 |
| 6 | 2.250 |
| 7 | 2.500 |
| 8 | 2.875 |
| 9 | 3.125 |
| 10 | 3.500 |
| 11 | 4.000 |
| 12 | 5.000 |
| 13 | 6.250 |
| 14 | 8.000 |
| 15 | 10.000 |
| 16 | 12.625 |
| 17 | 15.875 |
| 18 | 20.000 |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |

In some embodiments, a new table may be defined. For instance, while Table 6 may be reused, the reserved values may be substituted with higher values. As one example, the values of table 7 can be used.

TABLE 7

| $\beta_{offset}^{G-UCI}$ |
|---|
| 10.000 |
| 12.625 |
| 15.875 |
| 20.000 |
| 31.000 |
| 50.000 |
| 80.000 |
| 126.000 |

In some embodiments with respect to scrambling sequence for CG-UCI, a user specific sequence may be used to scramble both UL-SCH and the CG-UCI. A cell-specific sequence may be used for scrambling UL-SCH and the CG-UCI, in which the cell-specific sequence may correspond to a cell identity (ID) or a physical cell ID. The cell-specific sequence may be used to scramble CG-UCI, while a user-specific sequence may be used to scramble UL-SCH.

In some embodiments with respect to frequency hopping and mapping of CG-UCI, if frequency hopping is enabled for CG UL transmission, the same mapping rules for CG-UCI and UL data may be used on each of the frequency hops, which may or may not be the same as the mapping rule for the case with disabled frequency hopping. When frequency hopping is enabled, different mapping rules may be applied on each of the frequency hops.

In some embodiments with respect to UCI feedback, The UE generates and transmits the UCI on a PUCCH or a PUSCH using one of a plurality of PUCCH formats, where the particular PUCCH format used may depend on the number of configured serving cells and/or whether or not simultaneous PUSCH and PUCCH transmissions are configured.

If the UE is configured for a single serving cell and is not configured for simultaneous PUSCH and PUCCH transmissions, then in subframe n UCI may be transmitted on on PUCCH using format 1/1a/1b/3 or 2/2a/2b if the UE is not transmitting PUSCH; or on PUSCH if the UE is transmitting PUSCH in subframe n unless the PUSCH transmission corresponds to a Random Access Response Grant or a retransmission of the same transport block as part of the contention based random access procedure, in which case UCI is not transmitted If the UE is configured for a single serving cell and simultaneous PUSCH and PUCCH transmission, then in subframe n UCI may be transmitted: on PUCCH using format 1/1a/1b/3 if the UCI includes only of HARQ-ACK and/or SR; on PUCCH using format 2 if the UCI includes only of periodic CSI; on PUCCH using format 2/2a/2b/3 if the UCI includes periodic CSI and HARQ-ACK and if the UE is not transmitting PUSCH; or on PUCCH and PUSCH if the UCI includes HARQ-ACK/HARQ-ACK+SR/positive SR and periodic/aperiodic CSI and if the UE is transmitting PUSCH in subframe n, in which case the HARQ-ACK/HARQ-ACK+SR/positive SR is transmitted on PUCCH using format 1/1a/1b/3 and the periodic/aperiodic CSI transmitted on PUSCH unless the PUSCH transmission corresponds to a Random Access Response Grant or a retransmission of the same transport block as part of the contention based random access procedure, in which case periodic/aperiodic CSI is not transmitted.

If the UE is configured with more than one serving cell and is not configured for simultaneous PUSCH and PUCCH transmission, then in subframe n UCI may be transmitted on PUCCH using format 1/1a/1b/3/4/5 or 2/2a/2b if the UE is not transmitting PUSCH; on PUSCH of the serving cell if the UCI includes aperiodic CSI or aperiodic CSI and HARQ-ACK; on primary cell PUSCH if the UCI includes periodic CSI and/or HARQ-ACK and if the UE is transmitting on the primary cell PUSCH in subframe n unless the primary cell PUSCH transmission corresponds to a Random Access Response Grant or a retransmission of the same transport block as part of the contention based random access procedure, in which case UCI is not transmitted; or on PUSCH of the secondary cell with smallest SCellIndex if the UCI includes periodic CSI and/or HARQ-ACK and if the UE is not transmitting PUSCH on primary cell but is transmitting PUSCH on at least one secondary cell.

If the UE is configured with more than one serving cell and simultaneous PUSCH and PUCCH transmission, then in subframe n UCI may be transmitted on PUCCH using format 1/1a/1b/3 if the UCI includes only of HARQ-ACK and/or SR; on PUCCH using format 4/5 if the UCI includes only of HARQ-ACK and/or SR and/or periodic CSI; on PUCCH using format 2 if the UCI includes only of periodic CSI corresponding to one serving cell; if the UCI includes periodic CSI and HARQ-ACK and if the UE is not transmitting on PUSCH; on PUCCH and primary cell PUSCH if the UCI includes HARQ-ACK and periodic CSI and the UE is transmitting PUSCH on the primary cell, in which case the HARQ-ACK is transmitted on PUCCH using format 1a/1b/3 and the periodic CSI is transmitted on PUSCH unless the primary cell PUSCH transmission corresponds to a Random Access Response Grant or a retransmission of the same transport block as part of the contention based random access procedure, in which case periodic CSI is not transmitted; on PUCCH and PUSCH of the secondary cell with the smallest SCellIndex if the UCI includes HARQ-ACK and periodic CSI and if the UE is not transmitting PUSCH on primary cell but is transmitting PUSCH on at least one secondary cell, in which case, the HARQ-ACK is transmitted on PUCCH using format 1a/1b/3 and the periodic CSI is transmitted on PUSCH; and/or on PUCCH and PUSCH if the UCI includes HARQ-ACK/HARQ-ACK+SR/positive SR and aperiodic CSI in which case the HARQ-ACK/HARQ-ACK+SR/positive SR is transmitted on PUCCH using format 1/1a/1b/3 and the aperiodic CSI is transmitted on PUSCH of the serving cell.

FIG. 7 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (for example, network function virtualization (NFV)) is utilized, a hypervisor 702 may be executed to provide an execution environment for one or more network slices/sub-slices to utilize the hardware resources 700.

The processors 710 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. For example, in an embodiment in which the hardware resources 700 are implemented into the UE 105, the instructions 750 may cause the UE to perform some or all of the operation flow/algorithmic structure 300. The instructions 750 may cause the UE to perform some or all of the G-UCI generation as well as mapping onto a PUSCH. In other embodiments, the hardware resources 700 may be implemented into the AN 110. The instructions 750 may cause the AN 110 to perform some or all of the operation flow/algorithmic structure 305. The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

FIG. 8 illustrates example interfaces of baseband circuitry in accordance with some embodiments. As discussed above, the baseband circuitry 204 of FIG. 2 may comprise processors 204A-204E and a memory 204G utilized by said processors. The processors 204A-204E of the UE 105 may perform some or all of the operation flow/algorithmic structure 300, in accordance with various embodiments. Alternatively or additionally, processors 204A-204E of the UE 105 may perform some or all of the operation with respect to G-UCI in AUL transmission. The processors 204A-204E of the AN 110 may perform some or all of the operation flow/algorithmic structure 305, in accordance with various embodiments. Each of the processors 204A-204E may include a memory interface, 604A-604E, respectively, to send/receive data to/from the memory 204G. The processors 204A-204E of the UE 105 may be used to decode or process the activation/deactivation DCI of AUL transmission, or the DFI-DCI with respect to the AUL transmission; the processors 204A-204E of the AN 110 may be used to generate the activation/deactivation DCI of AUL transmission, or the DFI-DCI with respect to the AUL transmission.

The baseband circuitry 204 may further include one or more interfaces to communicatively couple to other circuitries/devices, such as a memory interface 812 (e.g., an interface to send/receive data to/from memory external to the baseband circuitry 204), an application circuitry interface 814 (for example, an interface to send/receive data to/from the application circuitry 202 of FIG. 2), an RF circuitry interface 816 (for example, an interface to send/receive data to/from RF circuitry 206 of FIG. 2), a wireless hardware connectivity interface 818 (for example, an interface to send/receive data to/from Near Field Communication (NFC) components, Bluetooth® components (for example, Bluetooth® Low Energy), Wi-Fi® components, and other communication components), and a power management interface 820 (for example, an interface to send/receive power or control signals).

Some non-limiting Examples of various embodiments are provided below.

Example 1 may include one or more non-transitory, computer-readable media (NTCRM) comprising instructions to, upon execution of the instructions by one or more processors of a UE, cause the UE to: decode downlink control information (DCI) to indicate an activation or a deactivation of a configured grant (CG) uplink (UL) transmission for the UE; and generate, based on the decoded DCI, an acknowledgement message to indicate a reception of the activation or deactivation of the CG UL transmission.

Example 2 may include the one or more NTCRM of example 1 and/or some other example herein, wherein the DCI is transmitted in a new radio (NR) Layer 1 (L1) message from a next-generation NodeB (gNB), and the activation or deactivation of the CG UL transmission is based on a Type-2 configured grant in NR.

Example 3 may include the one or more NTCRM of example 1 and/or some other example herein, wherein a DCI format 0_0 or a DCI format 0_1 is used to indicate the activation or deactivation of the GC UL transmission.

Example 4 may include the one or more NTCRM of example 3 and/or some other example herein, wherein the instructions, when executed, further cause the UE to: determine, based at least in part on an identifier-for-DCI-formats area of the DCI format 0_0 or the DCI format 0_1, a modulation and coding scheme (MCS) area and a resource block assignment area, whether the activation or deactivation DCI is an activation DCI or a deactivation DCI.

Example 5 may include the one or more NTCRM of example 4 and/or some other example herein, wherein the activation or deactivation DCI is configured according to Table 2(a) and Table 2(b).

Example 6 may include the one or more NTCRM of example 3 and/or some other example herein, wherein, upon execution, the instructions further cause the UE to determine, based on an identifier-for-DCI-formats area of the DCI format 0_0 or the DCI format 0_1, the DCI is used to indicate a downlink feedback information (DFI)—DCI for a hybrid automatic repeat request (HARQ) feedback with respect to the GC UL transmission.

Example 7 may include the one or more NTCRM of example 6 and/or some other example herein, wherein the DFI-DCI indicates one or more items of information: Bitmap with one HARQ-Acknowledgement (ACK) bit per CG configured HARQ process per TB (Z bits per TB, wherein Z is the total number of HARQ process IDs, e.g., Z=16), Transmit Power Control (TPC) command for PUSCH (2 bits), modulation and coding scheme (5 bits), carrier indicator (if format 0_1 is used), Bandwidth part indicator (if format 0_1 is used), antenna ports (if format 0_1 is used), and DMRS sequence initialization (if format 0_1 is used)

Example 8 may include the one or more NTCRM of example 6 and/or some other example herein, wherein, upon execution, the instructions further cause the UE to generate a HARQ—acknowledgement (ACK) feedback based on the decoded DFI-DCI.

Example 9 may include the one or more NTCRM of example 1 and/or some other example herein, wherein the acknowledgement message to indicate the reception of the activation of CG UL transmission includes one or more medium access control (MAC) control elements (CEs) to indicate one or more values of a logic channel identification (LCD).

Example 10 may include the one or more NTCRM of example 1 and/or some other example herein, wherein, upon execution, the instructions further cause the UE to transmit the acknowledgement message via a scheduled grant uplink transmission.

Example 11 may include the one or more NTCRM of example 1 and/or some other example herein, wherein, upon execution, the instructions further cause the UE to determine not to generate the acknowledgement message to indicate a reception of the deactivation of CG UL transmission, based on an indication of the deactivation of the CG UL transmission upon decoding the DCI.

Example 12 may include one or more non-transitory, computer-readable media (NTCRM) comprising instructions to, upon execution of the instructions by one or more processors of a gNB, cause the gNB to generate downlink control information (DCI) to indicate an activation or a deactivation of a configured grant (CG) UL transmission for a user equipment (UE).

Example 13 may include the one or more NTCRM of example 12 and/or some other example herein, wherein, upon execution, the instructions further cause the gNB to transmit the DCI in a new radio (NR) Layer 1 (L1) message.

Example 14 may include the one or more NTCRM of example 13 and/or some other example herein, wherein, upon execution, the instructions further cause the gNB to indicate one or more frequency resources for the CG UL transmission in the activation or deactivation DCI.

Example 15 may include the one or more NTCRM of example 13 and/or some other example herein, wherein, upon execution, the instructions further cause the gNB to indicate one or more time resources for the CG UL transmission in the activation or deactivation DCI.

Example 16 may include the one or more NTCRM of example 13 and/or some other example herein, wherein, upon execution, the instructions further cause the gNB to generate a radio resource control (RRC) message to grant the CG UL transmission, wherein the RRC message indicates one or more frequency resources and corresponding time resources for the CG UL transmission for a Type 2 CG.

Example 17 may include the one or more NTCRM of example 13 and/or some other example herein, wherein, upon execution, the instructions further cause the gNB to generate a downlink feedback information (DFI)—DCI message to the UE for a hybrid automatic repeat request (HARQ)—acknowledgement (ACK) feedback with respect to the CG UL transmission.

Example 18 may include the one or more NTCRM of example 13 and/or some other example herein, wherein, upon execution, the instructions further cause the gNB to generate a downlink feedback information (DFI)—DCI message to the UE for a hybrid automatic repeat request (HARQ)—acknowledgement (ACK) feedback to schedule the CG UL transmission for the UE.

Example 19 may include the one or more NTCRM of examples 17 and 18 and/or some other example herein, wherein the activation or deactivation DCI and the DFI—DCI have the same size.

Example 20 may include the one or more NTCRM of example 13 and/or some other example herein, wherein, upon execution, the instructions further cause the gNB to start a timer upon transmitting the activation or deactivation DCI.

Example 21 may include the one or more NTCRM of example 20 and/or some other example herein, wherein, upon execution, the instructions further cause the gNB to reset the timer upon receiving an acknowledgement message to indicate a reception of the activation or deactivation of CG UL transmission.

Example 21 may include the one or more NTCRM of example 20 and/or some other example herein, wherein, upon execution, the instructions further cause the gNB to re-transmit the activation or deactivation DCI upon an expiration of the timer.

Example 22 may include one or more non-transitory, computer-readable media (NTCRM) comprising instructions to, upon execution of the instructions by one or more processors of a UE, cause the UE to to generate configured grant-uplink control information (CG-UCI) with respect to an CG uplink (UL) transmission, wherein the CG-UCI indicates a remaining channel occupancy time (COT) is shared with the gNB, and a number of resources to be used for an uplink to downlink maximum COT (MCOT) sharing; and map the CG-UCI onto a physical uplink shared channel (PUSCH) for transmission.

Example 23 may include the one or more NTCRM of example 22 and/or some other example herein, wherein the CG-UCI includes a hybrid automatic repeat request (HARQ) process identifier (ID), a redundancy version (RV), a new data indicator (NDI), a PUSCH starting symbol to indicate a starting position of the PUSCH or whether a first symbol of a current slot is punctured, and a PUSCH ending symbol to indicate an ending position of the PUSCH or whether a last symbol of the current slot is punctured.

Example 24 may include the one or more NTCRM of example 22 and/or some other example herein, wherein to map the CG-UCI onto the PUSCH is to multiplex the CG-UCI with uplink shared channel (UL-SCH) onto the PUSCH, wherein the UL-SCH is rate matched across the CG-UCI and the CG-UCI is mapped within each CG PUSCH transmission.

Example 25 may include the one or more NTCRM of example 24 and/or some other example herein, wherein to map the CG-UCI onto the PUSCH is based on one or more rules with respect to FIGS. 4-6.

Example 26 may include the one or more NTCRM of example 22 and/or some other example herein, wherein a number of coded modulation symbols per layer for CG-UCI transmission can be evaluated as follows:

$$Q'_{G\text{-}UCI\_1} = \min\left\{\left\lceil \frac{(O_{G\text{-}UCI} + L_{G\text{-}UCI}) \cdot \beta_{offset}^{G\text{-}UCI} \cdot \sum_{l=0}^{N_{symb,all}^{PUSCH}-1} M_{sc}^{UCI}(l)}{\sum_{r=0}^{C_{UL\text{-}SCH}-1} K_r} \right\rceil,\right.$$

$$\left. \left\lceil \alpha \cdot \sum_{l=l_0}^{N_{symb,all}^{PUSCH}-1} M_s^{UCI}(l) \right\rceil \right\} \text{ and/or by}$$

$$Q'_{G\text{-}UCI\_2} = \min\left\{\left\lceil \frac{(O_{G\text{-}UCI\_2} + L_{G\text{-}UCI}) \cdot \beta_{offset}^{G\text{-}UCI} \cdot \sum_{l=0}^{N_{symb,all}^{PUSCH}-1} M_{sc}^{UCI}(l)}{\sum_{r=0}^{C_{UL\text{-}SCH}-1} K_r} \right\rceil,\right.$$

$$\left. \left\lceil \alpha \cdot \sum_{l=l_0}^{N_{symb,all}^{PUSCH}-1} M_{sc}^{UCI}(l) \right\rceil - Q'_{G\text{-}UCI\_1} \right\}$$

wherein, $O_{G\text{-}UCI\_1}$ is a number of CG-UCI bits, $O_{G\text{-}UCI\_2}$ is a number of CG-UCI bits mapped into the CSI part 2 REs, $L_{G\text{-}UCI}$ indicates a number of cyclic redundancy check (CRC) bits for the CG-UCI, $\beta_{offset}^{G\text{-}UCI}$ is an offset value of the CG-UCI, $M_{sc}^{UCI}$ is a number of resource elements that is to be used for UCI transmission, $N_{symb,all}^{PUSCH}$ is a total number of OFDM symbols for the PUSCH, $C_{UL\text{-}SCH}$ is a number of code blocks for UL-SCH of the PUSCH transmission, $K_r$ is an r-th code block size for an uplink shared channel (UL-SCH) of the PUSCH transmission, and $M_{sc}^{UCI}$ is a number of resource elements that may be used for CG-UCI transmission in an OFDM symbol l, and l=0, 1, 2, ..., $N_{symb,all}^{PUSCH}$ in the PUSCH transmission.

Example 27 may include the one or more NTCRM of example 26 and/or some other example herein, wherein the $\beta_{offset}^{G\text{-}UCI}$ is determined by a radio resource control (RRC) signaling for a Type 1 CG UL configuration.

Example 28 may include the one or more NTCRM of example 27 and/or some other example herein, wherein the $\beta_{offset}^{G\text{-}UCI}$ is determined by an indication of an activation downlink control information (DCI) to indicate a $\beta_{offset}$ value based on a set of $\beta_{offset}$ values that are available for the CG-UCI, for a Type 2 AUL configuration.

Example 29 may include one or more non-transitory, computer-readable media (NTCRM) comprising instructions to, upon execution of the instructions by one or more processors of a gNB, cause the gNB to generate a message, to a user equipment (UE), to indicate an offset value with respect to configured grant-uplink control information (CG-UCI) for a configured grant (CG) uplink (UL) transmission operating in an unlicensed spectrum; and decode the CG-UCI.

Example 30 may include the one or more NTCRM of example 29 and/or some other example herein, wherein, upon execution, the instructions further to cause the gNB to transmit the message in activation downlink control information (DCI).

Example 31 may include the one or more NTCRM of example 30 and/or some other example herein, wherein, upon execution, the instructions further to cause the gNB to transmit the message in a higher layer signaling.

Example 32 may include an apparatus comprising means to perform one or more elements of a method or NTCRM described in or related to any of examples 1-31, or any other method or process described herein.

Example 33 may include one or more non-transitory computer-readable media comprising instructions to cause an electronic device, upon execution of the instructions by one or more processors of the electronic device, to perform one or more elements of a method or NTCRM described in or related to any of examples 1-31, or any other method or process described herein.

Example 34 may include an apparatus comprising logic, modules, and/or circuitry to perform one or more elements of a method or NTCRM described in or related to any of examples 1-31, or any other method or process described herein.

Example 35 may include a method, technique, or process as described in or related to any of examples 1-31, or portions or parts thereof.

Example 36 may include an apparatus comprising: one or more processors and one or more computer-readable media comprising instructions that, when executed by the one or more processors, cause the one or more processors to perform the method, techniques, or process as described in or related to any of examples 1-31, or portions thereof.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory, computer-readable media (NTCRM) comprising instructions to, upon execution of the instructions by one or more processors of a user equipment (UE), cause the UE to:
   decode downlink control information (DCI) within DCI format 0_1 transmission to detect a flag;
   determine, based on the flag, that the DCI includes either: downlink feedback information (DFI); or configured grant (CG) activation or deactivation information to activate or deactivate a CG uplink (UL) transmission for the UE; and
   process the DCI based on determination of whether the DCI includes the DFI or the CG activation or deactivation information.

2. The one or more NTCRM of claim 1, wherein: the DCI format 0_1 transmission is within a new radio (NR) Layer 1 (L1) message from a next-generation NodeB (gNB), and the DCI includes the CG activation or deactivation information for a Type-2 configured grant in NR.

3. The one or more NTCRM of claim 1, wherein the DCI includes the CG activation or deactivation information to activate or deactivate CG UL transmission.

4. The one or more NTCRM of claim 3, wherein, upon execution, the instructions further cause the UE to determine, based on a value set for certain fields, whether the CG activation or deactivation information is to activate or deactivate the CG UL transmission.

5. The one or more NTCRM of claim 3, wherein, the DCI is to indicate DFI that includes a hybrid automatic repeat request (HARQ) feedback with respect to an UL transmission.

6. The one or more NTCRM of claim 5, wherein, upon execution, the instructions further cause the UE to transmit the UL transmission based on a configured grant.

7. The one or more NTCRM of claim 1, wherein the DCI includes CG activation or deactivation information and, upon execution, the instructions further cause the UE to generate, based on the decoded DCI, an acknowledgement message to indicate reception of the CG activation or deactivation information, the acknowledgement message to include one or more medium access control (MAC) control elements (CEs) to indicate one or more values of a logic channel identification (LCD).

8. The one or more NTCRM of claim 7, wherein, upon execution, the instructions further cause the UE to transmit the acknowledgement message via a scheduled grant uplink transmission.

9. The one or more NTCRM of claim 1, wherein the DCI includes CG deactivation information and, upon execution, the instructions further cause the UE to determine not to generate an acknowledgement message to indicate a reception of the CG deactivation information.

10. One or more non-transitory, computer-readable media (NTCRM) comprising instructions to, upon execution of the instructions by one or more processors of a next-generation NodeB (gNB), cause the gNB to:
  generate first downlink control information (DCI) to include configured grant (CG) activation or deactivation information to indicate an activation or a deactivation of a CG UL transmission for a user equipment (UE), the first DCI to further include a first flag to indicate that the first DCI is to include the CG activation or deactivation information; and
  generate second DCI to include downlink feedback information (DFI) related to an UL transmission, the second DCI to further include a second flag to indicate that the second DCI is to include the DFI; and
  transmit the first and second DCI in new radio (NR) Layer 1 (L1) messages.

11. The one or more NTCRM of claim 10, wherein, upon execution, the instructions further cause the gNB to indicate one or more frequency resources for the CG UL transmission in the CG activation or deactivation information.

12. The one or more NTCRM of claim 10, wherein, upon execution, the instructions further cause the gNB to generate a radio resource control (RRC) message to grant the CG UL transmission, wherein the RRC message indicates one or more frequency resources and corresponding time resources for the CG UL transmission for a Type 2 CG.

13. The one or more NTCRM of claim 10, wherein the DFI includes hybrid automatic repeat request (HARQ) acknowledgement (ACK) feedback with respect to the CG UL transmission.

14. The one or more NTCRM of claim 10, wherein the first DCI and the second DCI are both of a same DCI format and size.

15. The one or more NTCRM of claim 10, wherein, upon execution, the instructions further cause the gNB to start a timer upon transmitting the first DCI.

16. The one or more NTCRM of claim 15, wherein, upon execution, the instructions further cause the gNB to reset the timer upon receiving an acknowledgement message to indicate a reception of the activation or deactivation information.

17. The one or more NTCRM of claim 15, wherein, upon execution, the instructions further cause the gNB to retransmit the activation or deactivation information upon an expiration of the timer.

18. An apparatus, comprising:
  a central processing unit (CPU) to generate configured grant-uplink control information (CG-UCI) with respect to an CG uplink (UL) transmission, wherein the CG-UCI indicates a remaining channel occupancy time (COT) is shared with the gNB, and a number of resources to be used for an uplink to downlink maximum COT (MCOT) sharing; and
  one or more baseband processors coupled with the CPU, to map the CG-UCI onto a physical uplink shared channel (PUSCH) for transmission.

19. The apparatus of claim 18, wherein the CG-UCI includes a hybrid automatic repeat request (HARQ) process identifier (ID), a redundancy version (RV), a new data indicator (NDI), a PUSCH starting symbol to indicate a starting position of the PUSCH or whether a first symbol of a current slot is punctured, and a PUSCH ending symbol to indicate an ending position of the PUSCH or whether a last symbol of the current slot is punctured.

20. The apparatus of claim 18, wherein to map the CG-UCI onto the PUSCH, the one or more baseband processors is to multiplex the CG-UCI with uplink shared channel (UL-SCH) onto the PUSCH, wherein the UL-SCH is rate matched across the CG-UCI and the CG-UCI is mapped within each CG PUSCH transmission of the PUSCH.

21. The apparatus of claim 18, wherein a number of coded modulation symbols per layer for CG-UCI transmission is evaluated based on:

$$Q'_{G\text{-}UCI\_1} = \min\left\{ \left\lceil \frac{(O_{G\text{-}UCI} + L_{G\text{-}UCI}) \cdot \beta_{offset}^{G\text{-}UCI} \cdot \sum_{l=0}^{N_{symb,all}^{PUSCH}-1} M_{sc}^{UCI}(l)}{\sum_{r=0}^{C_{UL\text{-}SCH}-1} K_r} \right\rceil, \left\lceil \alpha \cdot \sum_{l=l_0}^{N_{symb,all}^{PUSCH}-1} M_{sc}^{UCI}(l) \right\rceil \right\}$$

wherein, $O_{G\text{-}UCI}$ is a number of CG-UCI bits, $L_{G\text{-}UCI}$ indicates a number of cyclic redundancy check (CRC) bits for the CG-UCI, $\beta_{offset}^{G\text{-}UCI}$ is an offset value of the CG-UCI, $M_{sc}^{UCI}$ is a number of resource elements that is to be used for UCI transmission, $N_{symb,all}^{PUSCH}$ is a total number of OFDM symbols for the PUSCH, $C_{UL\text{-}SCH}$ is a number of code blocks for uplink shared channel (UL-SCH) of the PUSCH transmission, $K_r$ is an r-th code block size for the UL-SCH of the PUSCH transmission, and $M_{sc}^{UCI}$ is a number of resource elements that is to be used for CG-UCI transmission in an OFDM symbol l, and l=0, 1, 2, . . . , $N_{symb,all}^{PUSCH}-1$ in the PUSCH transmission.

22. The apparatus of claim 21, wherein the number of coded modulation symbols per layer for CG-UCI transmission is further evaluated based on:

$$Q'_{G\text{-}UCI\_2} = \min\left\{ \left\lceil \frac{(O_{G\text{-}UCI\_2} + L_{G\text{-}UCI}) \cdot \beta_{offset}^{G\text{-}UCI} \cdot \sum_{l=0}^{N_{symb,all}^{PUSCH}-1} M_{sc}^{UCI}(l)}{\sum_{r=0}^{C_{UL\text{-}SCH}-1} K_r} \right\rceil, \left\lceil \alpha \cdot \sum_{l=l_0}^{N_{symb,all}^{PUSCH}-1} M_{sc}^{UCI}(l) \right\rceil - Q'_{G\text{-}UCI\_1} \right\}$$

wherein, $O_{G\text{-}UCI\_2}$ is a number of CG-UCI bits mapped into channel state information (CSI) part 2 resource elements.

23. The apparatus of claim 22, wherein the $\beta_{offset}^{G\text{-}UCI}$ is determined by an indication of an activation downlink control information (DCI) to indicate a $\beta_{offset}$ value based on a set of $\beta_{offset}$ values that are available for the CG-UCI, for a Type 2 autonomous uplink (AUL) configuration.

24. A method of operating a next-generation NodeB (gNB), the method comprising:

generating a message, to a user equipment (UE), to indicate a configured grant (CG) offset value to be used to multiplex CG-uplink control information (CG-UCI) with uplink shared channel (UL-SCH) data into a physical uplink shared channel (PUSCH) for a CG uplink (UL) transmission operating in an unlicensed spectrum; and upon reception from the UE, decoding the CG-UCI.

25. The method of claim 24, wherein the message is transmitted by radio resource control (RRC) signaling.

26. A method of operating a user equipment (UE), the method comprising:

receiving a message that includes an indication of a configured grant (CG) offset value that is to be used to multiplex CG-uplink control information (CG-UCI) with uplink shared channel (UL-SCH) data into a physical uplink shared channel (PUSCH) transmission;

determining a number of coded modulation symbols per layer for the CG-UCI based on the CG offset value;

generating the PUSCH transmission to include the number of coded modulation symbols; and transmitting the PUSCH transmission.

27. The method of claim 26, further comprising:

determining the number of coded modulation symbols per layer for CG-UCI ($Q'_{G\text{-}UCI}$) based on:

$$Q'_{G-UCI} = \min\left\{\left\lceil\frac{(O_{G-UCI} + L_{G-UCI}) \cdot \beta_{offset}^{G-UCI} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left\lceil \alpha \cdot \sum_{l=l_0}^{N_{symb,all}^{PUSCH}-1} M_{sc}^{UCI}(l)\right\rceil\right\},$$

wherein $O_{G\text{-}UCI}$ is a number of CG-UCI bits, $L_{G\text{-}UCI}$ is a number of cyclic redundancy check (CRC) bits for the CG-UCI, $\beta_{offset}^{G\text{-}UCI}$ is the CG offset value, $M_{sc}^{UCI}$ is a number of resource elements that is to be used for the CG-UCI, $N_{symb,all}^{PUSCH}$ is a total number of OFDM symbols for the PUSCH transmission, $C_{UL\text{-}SCH}$ is a number of code blocks for the UL-SCH of the PUSCH transmission, $K_r$ is an r-th code block size for the UL-SCH of the PUSCH transmission, and $M_{sc}^{UCI}$ is a number of resource elements that is to be used for CG-UCI in an OFDM symbol l, and l=0, 1, 2, ..., $N_{symb,all}^{PUSCH}-1$ in the PUSCH transmission.

28. The method of claim 26, further comprising: receiving the message via radio resource control (RRC) signaling.

* * * * *